United States Patent
Itoh

(10) Patent No.: US 9,209,997 B2
(45) Date of Patent: Dec. 8, 2015

(54) COMMUNICATION APPARATUS AND COMMUNICATION SYSTEM

(75) Inventor: Shingo Itoh, Komaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 842 days.

(21) Appl. No.: 13/428,934

(22) Filed: Mar. 23, 2012

(65) Prior Publication Data
US 2013/0077619 A1 Mar. 28, 2013

(30) Foreign Application Priority Data

Sep. 26, 2011 (JP) ................. 2011-209759

(51) Int. Cl.
*H04L 12/66* (2006.01)
*H04N 1/00* (2006.01)

(52) U.S. Cl.
CPC ............ *H04L 12/66* (2013.01); *H04N 1/00209* (2013.01); *H04N 1/00236* (2013.01)

(58) Field of Classification Search
CPC .......... H04N 1/00209; H04N 1/00236; H04N 1/00244; H04L 12/66
USPC ............................ 370/352, 356, 354; 358/400
See application file for complete search history.

(56) References Cited

U.S. PATENT DOCUMENTS

| | | | |
|---|---|---|---|
| 7,072,056 B1 * | 7/2006 | Greaves et al. | 358/1.15 |
| 2010/0231951 A1 | 9/2010 | Oshima et al. | |
| 2010/0238503 A1 * | 9/2010 | Sakuda et al. | 358/1.15 |
| 2011/0122880 A1 * | 5/2011 | Saito et al. | 370/401 |

FOREIGN PATENT DOCUMENTS

| | | |
|---|---|---|
| JP | 2010-219688 A | 9/2010 |
| JP | 2010-226293 A | 10/2010 |
| JP | 2011-077619 A | 4/2011 |
| JP | 2013021532 A | 1/2013 |

OTHER PUBLICATIONS

Notice of Reasons for Rejection issued in related Japanese Patent Application No. 2011-209759, Feb. 17, 2015.

* cited by examiner

*Primary Examiner* — Kwang B Yao
*Assistant Examiner* — Hien Nguyen
(74) *Attorney, Agent, or Firm* — Merchant & Gould PC

(57) ABSTRACT

A communication apparatus includes: a capability-information generating section which generates a first capability information including a first receivable-period information in relation to a first receivable period; a first transmission section which transmits the first capability information to the communication-destination device via the IP network; a first receiving section which receives a first data transmitted from the communication-destination device via the IP network during the first receivable period; a storage section in which a second data to be transmitted to the communication-destination device is stored; a second receiving section which receives a second capability information including a second receivable-period information in relation to a second receivable period; and a second transmission section which transmits a second data stored in the storage section to the communication-destination device during the second receivable period based on the second capability information.

5 Claims, 20 Drawing Sheets

| DAY | RECEIVABLE PERIOD |
|---|---|
| MON | 10:00 – 18:00 |
| TUE | 10:00 – 18:00 |
| WED | 10:00 – 15:00 |
| THU | 10:00 – 18:00 |
| FRI | 10:00 – 18:00 |
| SAT | NOT RECEIVABLE |
| SUN | NOT RECEIVABLE |

| COMMUNICATION-DESTINATION INFORMATION | POINTER INFORMATION |
|---|---|
| 052-111-2345 (MULTIFUNCTION DEVICE 110) | POINTER 1 |
| 03-1234-5678 (MULTIFUNCTION DEVICE 110a) | POINTER 2 |
| 06-9876-5432 (MULTIFUNCTION DEVICE 110b) | POINTER 3 |
| ⋮ | ⋮ |

| COMMUNICATION-DESTINATION INFORMATION | OFFSET TIME |
|---|---|
| 052-333-4567 (MULTIFUNCTION DEVICE 10) | 10 MINUTES |
| 03-1234-5678 (MULTIFUNCTION DEVICE 110a) | 5 MINUTES |
| 06-9876-5432 (MULTIFUNCTION DEVICE 110b) | 0 MINUTES |
| : | : |

| JOB NO. | COMMUNICATION-DESTINATION INFORMATION | TIME & DATE OF CARRYING OUT JOB |
|---|---|---|
| 1 | 052-111-2345 (MULTIFUNCTION DEVICE 110) | 10:00 MONDAY |
| 2 | 052-111-2345 (MULTIFUNCTION DEVICE 110) | 10:00 MONDAY |
| 3 | 03-1234-5678 (MULTIFUNCTION DEVICE 110a) | 10:05 MONDAY |
| 4 | 06-9876-5432 (MULTIFUNCTION DEVICE 110b) | 10:10 MONDAY |
| : | : | : |

Fig. 10

```
v = 0
o = user sessionID sessionVER IN IP4 XXX. XXX. XXX. XXX
s = ngnprint
c = IN IP4 xxx. xxx. xxx. xxx
t = 0
m = aaplication 80 TCP ngnprint 0
```

Fig. 11

```
v = 0
o = user2 sessionID sessionVER IN IP4 XXX. XXX. XXX. XXX
s = ngnprint
c = IN IP4 xxx. xxx. xxx. xxx
t = 0
m = aaplication 80 TCP ngnprint 0
```

Fig. 12

```
01: GET /ngnfax-capability.xml HTTP/1.1
02: HOST: XXX. XXX. XXX. XXX
03: Accept: test/xml
```

Fig. 13

```
01: HTTP/1.1 200 OK
02: Content-type: text/xml
03: Content-Length: xxxx
04: CONNECTION: CLOSE
05:
06:<"?xml version="1.0" encoding="utf-8"?>
07:<root>
08:<a:deviceAvailableTime>
09:        mon:10:00-18:00
10:        tue:10:00-18:00
11:        wed:10:00-18:00
12:        thu:10:00-18:00
13:        fri:10:00-18:00
14:        sat:00:00-00:00
15:        sun:00:00-00:00
16: </a:deviceAvailableTime>
09: </root>
```

```
01: HTTP/1.1 200 OK
02: Content-type: text/xml
03: Content-Length: xxxx
04: CONNECTION: CLOSE
05:
06: <"?xml version="1.0" encoding=" utf-8"?>
07: <root>
08: <a:deviceCapability>
09:     <a:SupportFormat>image/jpg, image/tiff</a:SupportFormat>
10:     <a:SupportResolution>300x300, 600x600, 1200x1200</a:Support Resolution >
11:     <a:SupportPaperSize>LTR,A4,LEGAL</a:SupportPaperSize>
12: <a:deviceCapability>
13: <a:deviceAvailableTime>
14:     mon:10:00-18:00
15:     tue:10:00-18:00
16:     wed:10:00-18:00
17:     thu:10:00-18:00
18:     fri:10:00-18:00
19:     sat:00:00-00:00
20:     sun:00:00-00:00
21: </a:deviceAvailableTime>
22: </root>
```

A22 (lines 08–12)
A21 (lines 13–21)

Fig. 15

```
01: POST /information.txt HTTP/1.1
02: HOST: XXX. XXX. XXX. XXX
03:
04: Transmit time change comlete. Time:mon:10:10   ~A31
```

Fig. 16

```
01: POST /image_data.tiff HTTP/1.1
02: HOST: XXX. XXX. XXX. XXX
03:
04: (BINARY DATA OF image_data.tiff)
05: (BINARY DATA OF image_data.tiff)
            .
            .
            .
XXX: (BINARY DATA OF image_data.tiff)
```

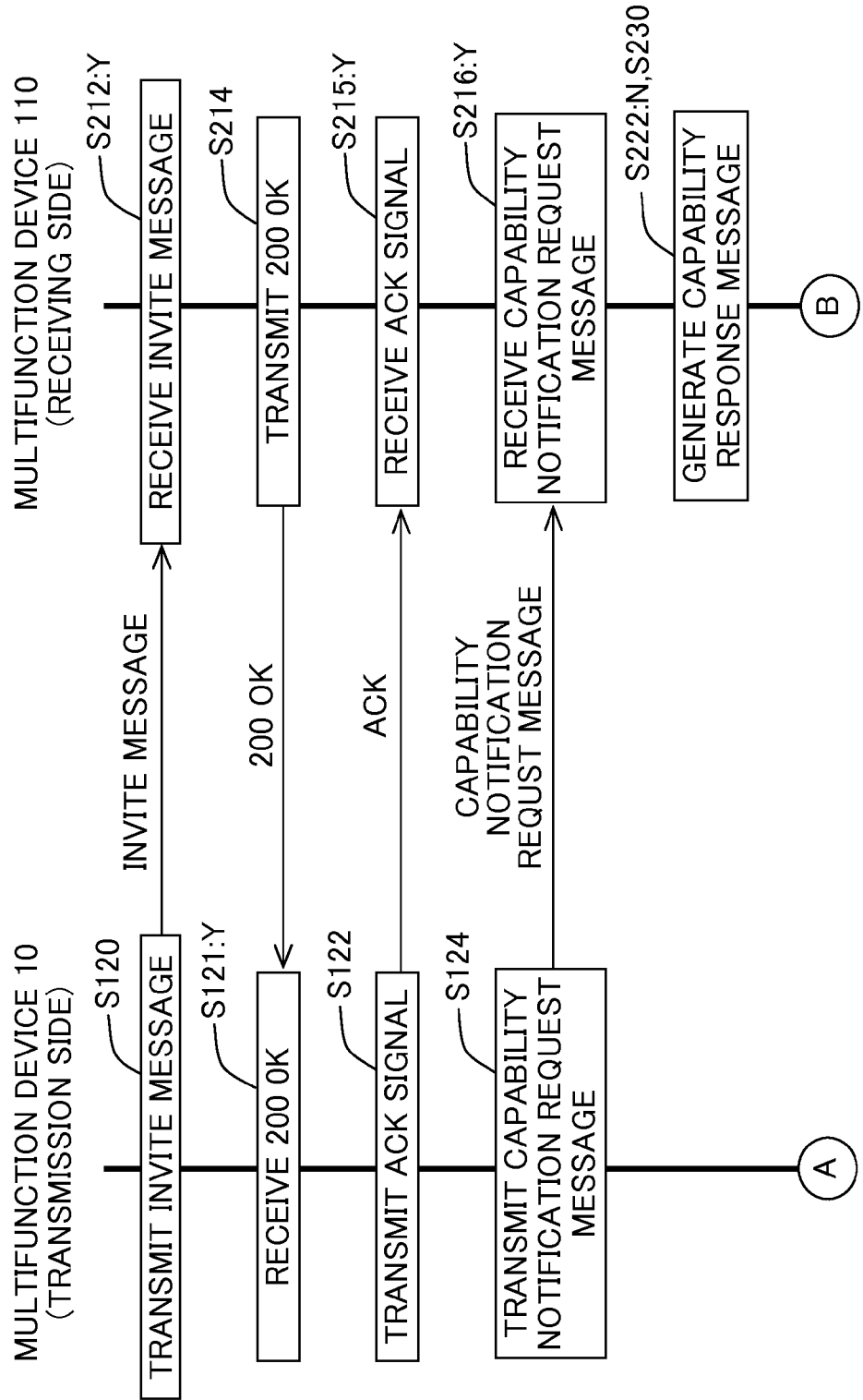

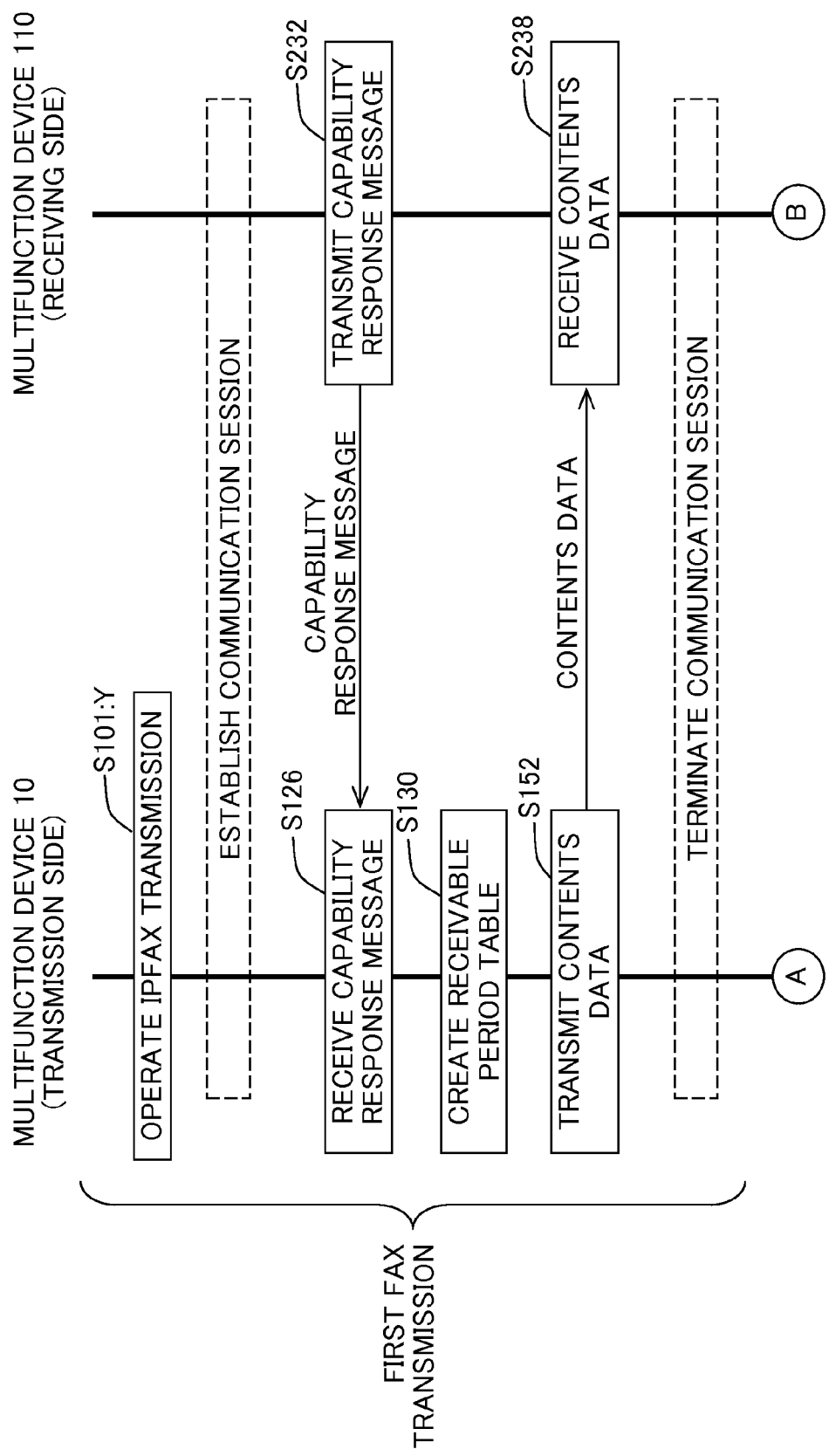

COMMUNICATION APPARATUS AND COMMUNICATION SYSTEM

CROSS REFERENCE TO RELATED APPLICATION

The present application claims priority from Japanese Patent Application No. 2011-209759, filed on Sep. 26, 2011, the disclosure of which is incorporated herein by reference in its entirety.

BACKGROUND OF THE INVENTION

1. Field of the Invention

The present invention relates to a communication apparatus and a communication system which carry out data communication.

2. Description of the Related Art

In a FAX apparatus described in Japanese Patent Application Laid-open No. 2011-77619, during a low power consumption mode of a sub CPU (central processing unit) of a first FAX apparatus, when FAX data is received by the first FAX apparatus, an apparatus on LAN which is capable of storing FAX data which has been received by the first FAX apparatus is searched. Moreover, the FAX data is stored temporarily in a second FAX apparatus which is searched. Thereafter, when the first FAX apparatus returns to a normal mode from the low power consumption mode, the first FAX apparatus acquires the FAX data from the second FAX apparatus, and carries out printing.

For confidentiality reasons of data, sometimes there exists a period during which no FAX data is intended to be received (for example, period other than business hours of an office). During the period in which the FAX data is not intended to be received, in a case of rejecting data reception by a method such as putting a power supply of an apparatus of a FAX receiving side OFF, if an apparatus on a FAX sending side transmits FAX data during the period in which the FAX data is not intended to be received, since the apparatus on the FAX transmitting side is required to carry out a redial processing (processing in which the FAX data is transmitted once again from the apparatus on the FAX sending side after a predetermined time has elapsed), it is inefficient. Moreover, if the apparatus on the FAX receiving side does not return to a state in which it is capable of receiving the FAX data in a predetermined time, it becomes a communication error. In this case, since a user is required to carry out a procedure of FAX transmission once again, it is inefficient. In the present patent specification, a technology which enables to eliminate such inconvenience is described.

SUMMARY OF THE INVENTION

According to an aspect of the present invention, there is provided a communication apparatus which is configured to communicate with a communication-destination device via an IP network, the apparatus including: a capability-information generating section which generates a first capability information including a first receivable-period information in relation to a first receivable period, during which a first data which is transmitted from the communication-destination device via the IP network is acceptable by the apparatus; a first transmission section which transmits the first capability information to the communication-destination device via the IP network; a first receiving section which receives the first data transmitted from the communication-destination device via the IP network during the first receivable period; a storage section in which a second data which is to be transmitted to the communication-destination device is stored; a second receiving section which receives a second capability information including a second receivable-period information in relation to a second receivable period, during which the second data which is transmitted from the apparatus via the IP network is acceptable by the communication-destination device; and a second transmission section which transmits the second data which has been stored in the storage section to the communication-destination device during the second receivable period based on the second capability information, in a case that the second receiving section received the second capability information from the communication-destination device.

When there is a plurality of communication apparatuses according to the present invention, it is possible to carry out communication between the communication apparatuses by connecting the communication apparatuses via the IP network. Moreover, a communication apparatus on a data-receiving side is capable of transmitting, to a communication apparatus on a data-transmission side, a capability information which includes receivable-period information in relation to a receivable period during which the data is acceptable by the communication apparatus on the data-transmission side, by using the first transmission section. The communication apparatus on the data-transmission side is capable of identifying a period during which the communication apparatus on the data-receiving side is capable of receiving data, by receiving the capability information by the second receiving section. Moreover, the communication apparatus on the data-transmission side can wait for a transmission processing, while storing the data in the storage section, until the arrival of a period during which the communication apparatus on the data-receiving side is capable of receiving data. When the communication apparatus on the data-transmission side transmits data by using the second transmission section during the period during which the communication apparatus on the data-receiving side is capable of receiving data, the communication apparatus on the data-receiving side is capable of receiving the data by using the first receiving section.

Accordingly, it is possible to prevent a situation in which the data is transmitted from the communication apparatus on the data-transmission side during the period during which the communication apparatus on the data-receiving side is not capable of receiving the data. Therefore, it is possible to eliminate a need for carrying out a redialing process by an apparatus on a FAX-transmission side. Moreover, it is possible to eliminate a need for carrying out once again a procedure of FAX transmission by a user, which may arise due to communication error. Accordingly, it is possible to improve convenience of the user.

BRIEF DESCRIPTION OF THE DRAWINGS

FIG. 8 is a diagram showing an example of an offset table.

FIG. 9 is a diagram showing an example of a job table.

FIG. 10 is a diagram showing an example of an INVITE message in an SDP (Session Description Protocol).

FIG. 11 is a diagram showing an example of a 2000K message in the SDP.

FIG. 12 is a diagram showing an example of a capability notification request message.

FIG. 13 is a diagram showing an example of a capability response message.

FIG. 14 is a diagram showing an example of the capability response message.

FIG. 15 is a diagram showing an example of a change-complete notification of transmission time in the SDP.

FIG. 16 is diagram showing an example message of contents data.

FIGS. 18A and 18B are diagrams showing another concrete example of the operation of the communication system.

FIGS. 19A and 19B are diagrams showing still another concrete example of the operation of the communication system.

DESCRIPTION OF THE PREFERRED EMBODIMENTS

<Configuration of System>

Figure 1:
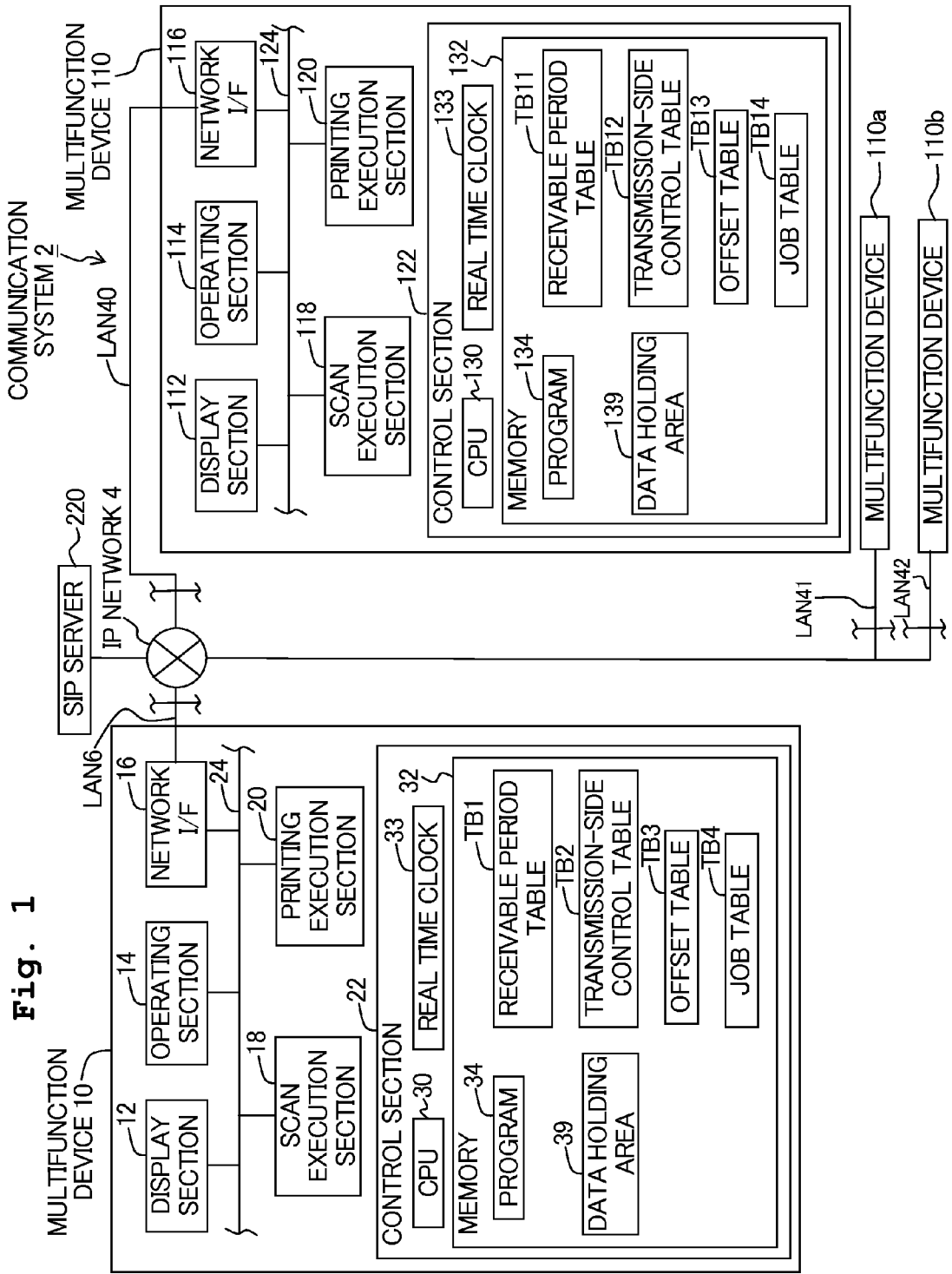
FIG. 1 is a system configuration diagram showing an example of a configuration of a communication system.

An embodiment will be described below by referring to the accompanying diagrams. As shown in FIG. 1, a communication system 2 includes an IP network 4, LANs (local area networks) 6, 40, 41, and 42, multifunction devices 10, 110, 110a, and 110b (examples of a communication apparatus), and an SIP (session initiation protocol) server 220. The multifunction device 10 is connected to the LAN 6. The multifunction devices 110, 110a, and 110b (hereinafter, "multifunction devices 110 to 110b") are connected to the LANs 40, 41, and 42 (hereinafter, "LANs 40 to 42") respectively. The LANs 6, 40, 41, and 42, and the SIP server 220 are connected to the IP network 4. The multifunction device 10, the SIP server 220, the multifunction devices 110 to 110b are mutually communicable via the LANs 6, 40, 41, and 42, and the IP network 4.

The IP network 4 is an IP network provided by a provider (the Internet service provider). The IP network 4 is controlled by the SIP server 220. An NGN (Next Generation Network) can be cited as an example of the IP network 4. The NGN is a next generation IP network which substitutes the existing public network. In other words, the NGN is a network in which an IP network for the Internet service and a telephone network for a telephone service, which are currently built separately, are integrated as an IP communication network by using an IP technology. Moreover, the multifunction devices 10, 110, 110a, and 110b are apparatuses which are capable of communicating FAX data by using an HTTP (Hyper Text Transfer Protocol) as an application layer and by using a TCP (Transmission Control Protocol) as a transport layer.

<Configuration of Multifunction Device 10>

A configuration of the multifunction device 10 will be described below. The multifunction device 10 includes multiple functions such as a printing function, a scanner function, a copy function, an electronic mail transceiving function, an IPFAX function, and a telephone function. The multifunction device 10 includes a display section 12, an operating section 14, a network I/F (interface) 16 (an example of a first transmission section, a first receiving section, a second transmission section, and a second receiving section), a scan execution section 18, a printing execution section 20, and a control section 22. Each of the abovementioned components having reference numerals from 12 to 22 is connected to a bus wire 24. The display section 12 is a display for displaying various information. The operating section 14 includes a plurality of keys. By operating the operating section 14, a user is capable of inputting various instructions to the multifunction device 10. The network I/F 16 is connected to the LAN 6. The scan execution section 18 includes a scan mechanism such as a CIS (Contact Image Sensor) and a CCD (Charge Coupled Device), and generates image data by scanning an object to be scanned. The printing execution section 20 includes a printing mechanism of a type such as an ink jet head type or a laser type, and carries out printing according to an instruction from the control section 22.

The control section 22 includes a CPU (Central Processing Unit) 30 (an example of a capability-information generating section), a memory 32 (an example of a storage section), and a real time clock (RTC) 33. The memory 32 stores a program 34, a receivable period table TB1, a transmission-side control table TB2, an offset table TB3, a job table TB4, and a data holding area 39. The CPU 30 carries out various controls according to the program 34. The real time clock 33 is a clock which receives an electric power supply from a built-in battery which is not connected directly to an electric power supply of the multifunction device 10, and continues to record the current time. In a state of a power supply OFF mode which will be described later, the electric power supply to the control section 22 is stopped but the real time clock 33 is capable of operating continuously by the built-in battery even during a period of power-supply OFF mode. It is possible to carry out control of date and time of recovery operation from the power-supply OFF mode and execution of time-specified transmission of a job by the real time clock 33.

A sleep mode and the power-supply OFF mode are examples of a control carried out by the CPU 30. In a state of the sleep mode, the electric power supply to components such as the printing execution section 20 is stopped, and it is possible to reduce power consumption. Moreover, during the sleep mode, since the electric power supply to the control section 22 is not stopped, it is possible to detect incoming FAX data. Moreover, as the incoming FAX data is detected during the sleep mode, the multifunction device 10 returns to a normal mode, and carries out printing by the printing execution section 20 upon receiving the FAX data. Whereas, in the state of the power supply OFF mode, in addition to the power supply to the printing execution section 20, the electric power supply to the control section 22 is also stopped. Accordingly, it is possible to reduce further the power consumption of the multifunction device 10 more than the power supply reduction in the sleep mode. However, in the state of the power-supply OFF mode, since the power supply to the control section 22 is also stopped, it is not possible to detect the incoming FAX data, and it is not possible to receive the FAX data.

It is possible to carry out the recovery operation from the power-supply OFF Mode by setting a recovery time in advance, and by operating the CPU 30 according to detection of arrival of the recovery time by the real time clock 33. Moreover, it is possible to carry out the recovery operation by operating the CPU 30 according to detection of pressing of a power-supply button of the operating section 14.

Figure 6:
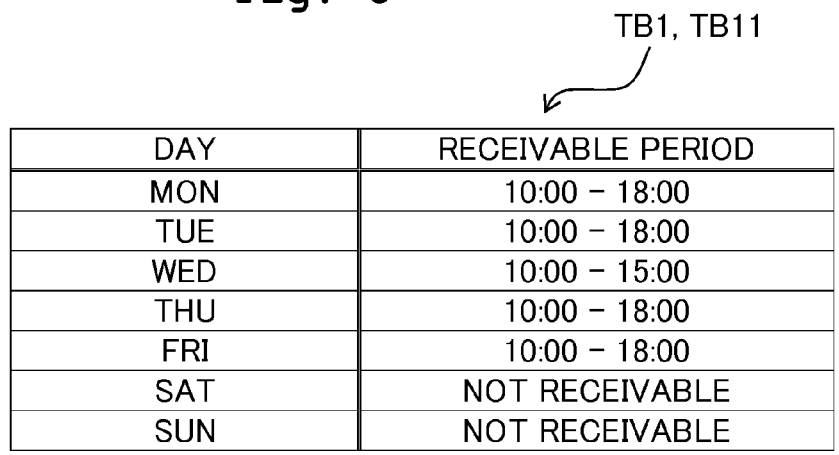
FIG. 6 is a diagram showing an example of a receivable-period table.

An example of the receivable period table TB1 is shown in FIG. 6. The receivable period table TB1 is a table which indicates a period (receivable period), during which the multifunction device 10 and a communication-destination device (multifunction devices from 110 to 110b) are capable of receiving data. A plurality of receivable period tables TB1 are created corresponding to the multifunction device 10 and the communication-destination device respectively. The receivable period table TB1 is capable of storing the receivable period for each day of a week. The receivable period table TB1 for the multifunction device 10 may be set by the user in advance. Moreover, the multifunction device 10 may be let to be in the power-supply OFF mode except during the receivable period. The receivable period table TB1 for each of the multifunction devices 110 to 110b, as it will be described later, is to be acquired by communication between the communication-destination device, and to be stored in the memory 32.

Figure 7:
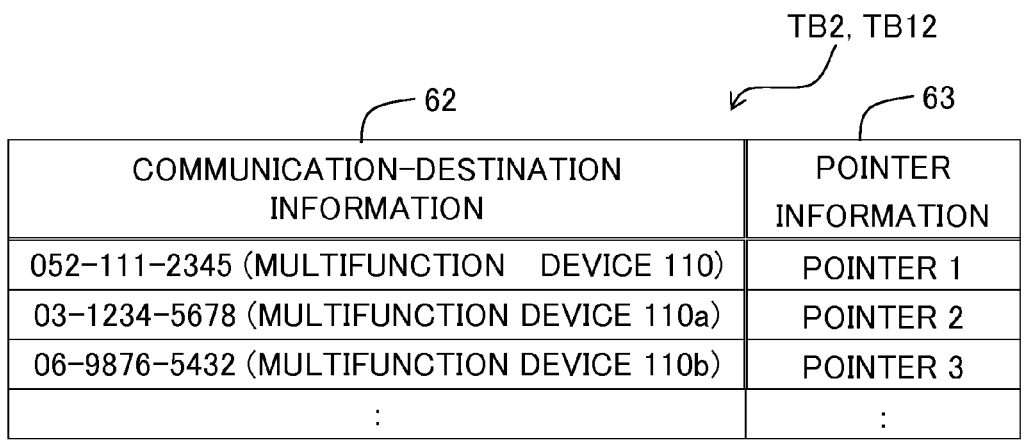
FIG. 7 is a diagram showing an example of a transmission-side control table.

An example of the transmission-side control table TB2 is shown in FIG. 7. The transmission-side control table TB2 stores a communication-destination information 62 and a pointer information 63. The communication-destination information 62 is an information (such as FAX numbers) for identifying the communication-destination device (multifunction devices from 110 to 110b). The pointer information 63 is information which indicates a relationship between each of the multifunction devices 110 to 110b and the receivable period table TB1 created for each of the multifunction devices 110 to 110b. By using the pointer information 63, it is possible to make an access to the receivable period table TB1 for the multifunction device which is specified in the communication-destination information 62.

An example of the offset table TB3 is shown in FIG. 8. The offset table TB3 is a table which is to be used at the time of creating a capability response message which will be described later. The offset table TB3 stores communication-destination information 72 and offset time 73. The communication-destination information 72 is information (such as FAX numbers.) for identifying each of the communication-destination devices. The offset time 73 is an offset value which delays starting time of receivable period.

An example of the job table TB4 is shown in FIG. 9. The job table TB4 is a table which stores specified time at the time of executing a job of time-specified transmission. The job table TB4 includes job number 81, communication-destination information 81, and job executing time 83. The job number 81 is a consecutive number which is to be assigned to each job. The communication-destination information 82 is information (such as FAX numbers) for identifying each of the communication-destination devices. The job executing time 83 is a time of executing a job (FAX transmission).

The data holding area 39 is an area which stores FAX data. The data holding area 39 is capable of storing a plurality of FAX data. The data holding area is also capable of storing a plurality of FAX data of the same communication-destination device.

<Configuration of Multifunction Devices 110 to 110b>

A configuration of the multifunction device 110 will be described below. The multifunction device 110 includes a display section 112, an operating section 114, a network I/F 116 (an example of the first transmission section, the first receiving section, the second transmission section, and the second receiving section), a scan execution section 118, a printing execution section 120, and a control section 122. The control section 122 includes a CPU 130 and a memory 132 (an example of the storage section). The memory 132 stores a program 134, a receivable period table TB11, a transmission-side control table TB12, an offset table TB13, a job table TB14, and a data holding area 139. Components of the multifunction device 110 being similar to the components of the multifunction device 10, the description in detail thereof will be omitted. Moreover, content of each of the receivable period table TB11, the transmission-side control table TB12, the offset table TB13, the job table TB14 stored in the multifunction device 110 being similar to the content of each of the receivable period table TB1, the transmission-side control table TB2, the offset table TB3, and the job table TB4, the description in detail thereof will be omitted. Furthermore, the structure of the multifunction device 110a and the structure of the multifunction device 110b being similar to the structure of the multifunction device 10, the diagrammatic represent thereof as of structural components in FIG. 1 will be omitted.

<Configuration of SIP Server 220>

A configuration of the SIP server 220 will be described below. The SIP server 220 stores upon associating an IP address of the multifunction device with a SIPURI (Session Initiation Protocol Uniform Resource Identifier) of the multifunction device for each of the multifunction devices 10, 110, 110a, and 110b. The SIP server 220 establishes a communication session among the multifunction devices 10, 110, 110a, and 110b by using an SIP (Session Initiation Protocol). In other words, for example, various commands for establishing the communication session for executing an IPFAX transmission between the multifunction device 10 and the multifunction device 110 are transmitted via the SIP server 220.

<IPFAX Transmission Process>

Next, an IPFAX transmission process will be described below. In the following description, the multifunction device 10 is a transmission-side equipment and the multifunction device 110 is a receiving-side equipment, and content of the IPFAX transmission will be described by citing a case of transmitting FAX data from the multifunction device 10 to the multifunction device 110 as an example.

Figure 2A:
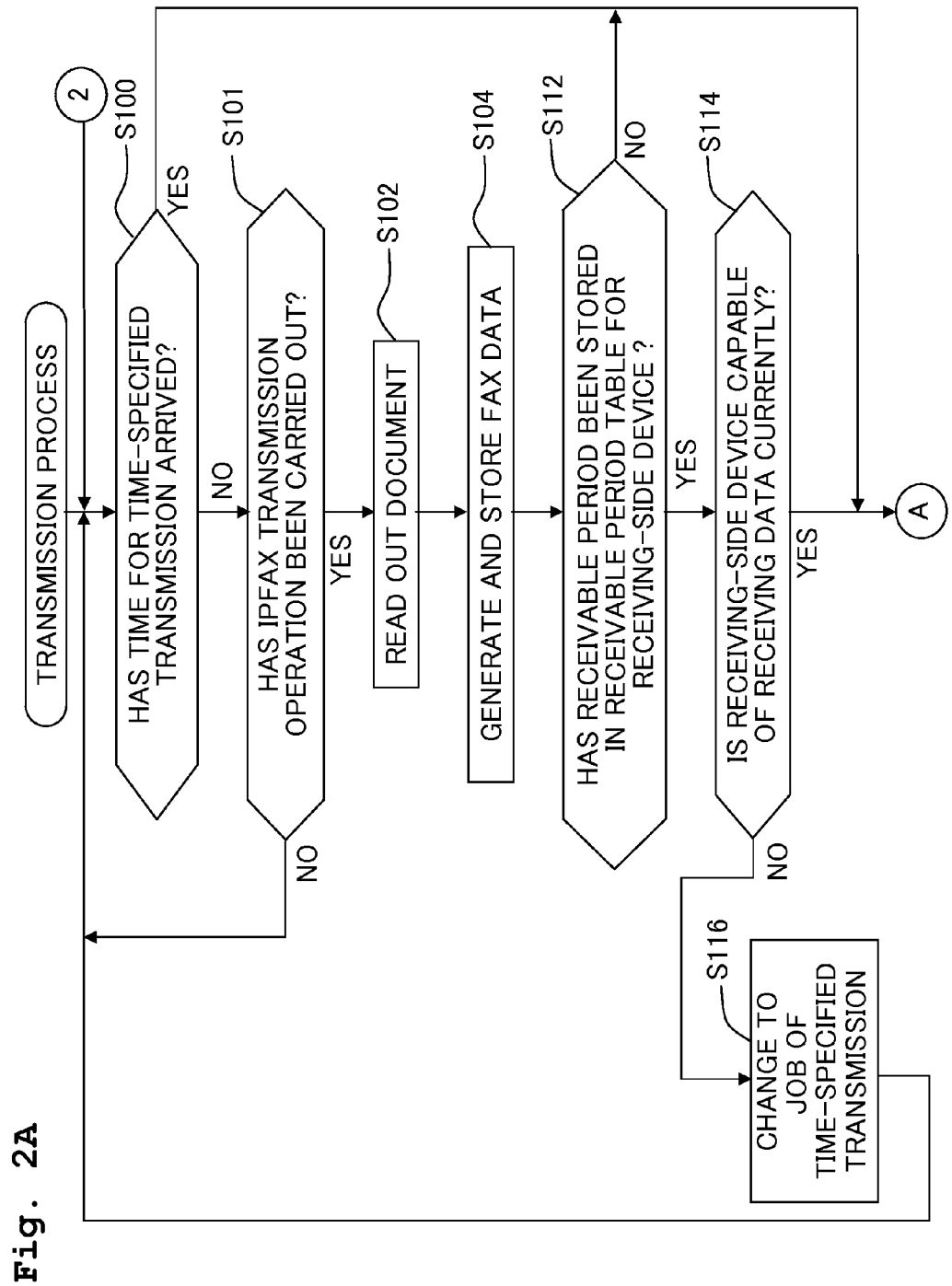
FIGS. 2A and 2B show a flowchart indicating a transmission process of a multifunction device on a transmission side.
Figure 2B:
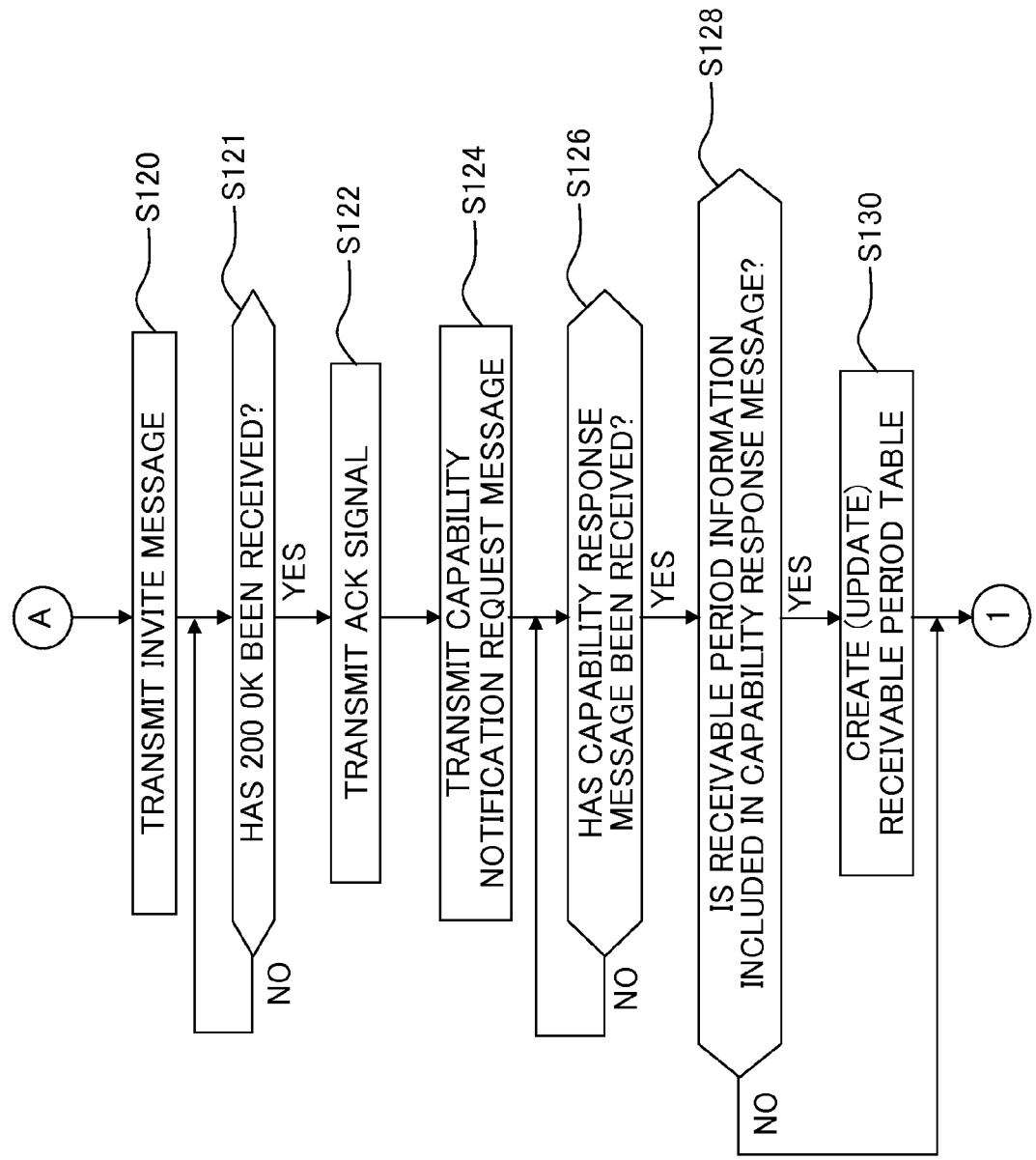
Figure 3A:
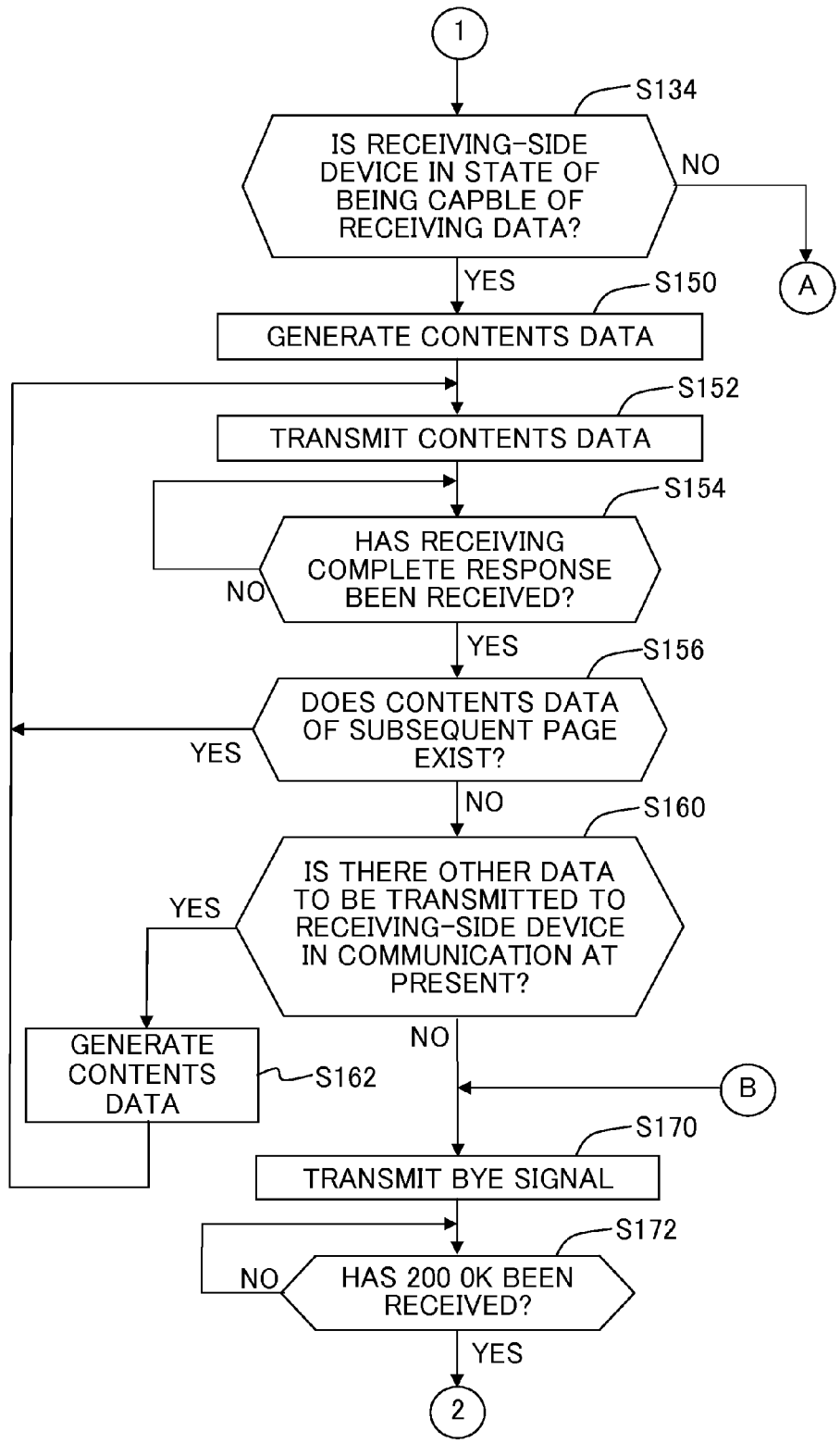
FIGS. 3A and 3B show a flowchart indicating the transmission process of the multifunction device on the transmission side.
Figure 3B:
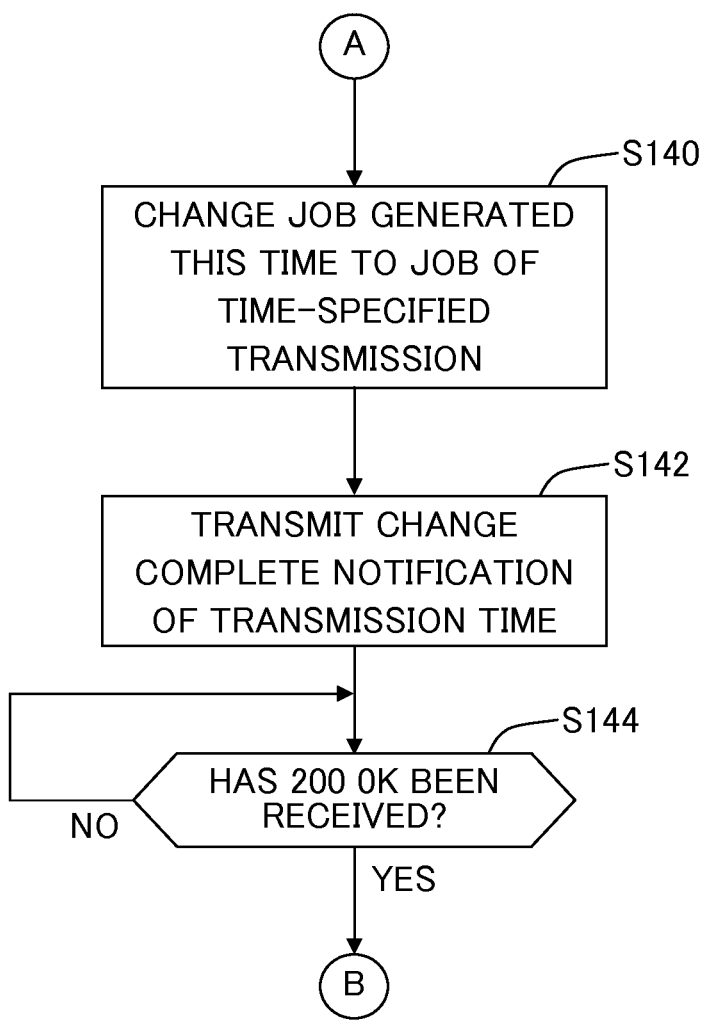

An operation of the multifunction device 10 which is the transmission-side equipment for transmitting FAX data will be described below by using FIG. 2 and FIG. 3. A flowchart in FIG. 2 and a flowchart in FIG. 3 are flowcharts of a procedure which is executed while an electric power supply of the multifunction device 10 is put ON. At step S100, the CPU 30 makes a judgment of whether or not the time for time-specified transmission of the FAX data has arrived. Concretely, the CPU 30, by using the real time clock 33, makes a judgment of whether a time from the job executing time 83 stored in the job table TB4 has arrived. When the time has arrived (YES at step S100), the process advances to step S120, and when the time has not arrived (NO at step S100), the process advances to step S101.

At step S101, the CPU 30 makes a judgment of whether or not an IPFAX transmission operation has been carried out. The IPFAX transmission operation is an operation in which, the user of the multifunction device 10 sets a document on an automatic document feeder which is not shown in the diagram, and carries out the IPFAX transmission operation by using the operating section 14 (for example, by dialing and then pressing a start button) in a state of the document set on the automatic document feeder. The IPFAX transmission operation includes an operation of inputting the SIPURI of the multifunction device 110 which is the destination of the FAX. When the IPFAX transmission operation has not been carried out (NO at step S101), the process returns to step S100, and when the IPFAX transmission operation has been carried out (YES at step S101), the process advances to step S102.

At step S102, the CPU 30 makes the scan execution section 18 scan the document which has been set on the automatic document feeder. Accordingly, the scan execution section 18 generates scan data. The CPU 30 stores the scan data generated by the scan execution section 18 in the memory 32. At step S104, the CPU 30 acquires the scan data stored in the memory 32, and carries out coding (compression) and generates FAX data, and stores the FAX data in the data holding area 39. Thereafter, the process advances to step S112.

At step S112, the CPU 30 makes a judgment of whether or not the receivable period has been stored in the receivable period table TB1 for the multifunction device 110. Concretely, the CPU 30 searches the receivable period table TB1 for the multifunction device 110 from among the plurality of receivable period tables TB1 stored in the memory 32 by using the pointer information of the multifunction device 110 which has been stored in the transmission-side control table TB2, and makes an access to the receivable period table TB1 which has been searched. Moreover, the CPU 30 makes the judgment by reading out content stored in the receivable period table TB1 for the multifunction device 110. When the receivable period has not been stored (NO at step S112), the process advances to step S120, and when the receivable period has been stored (YES at step S112), the process advances to step S114.

At step S114, the CPU 30 makes a judgment of whether or not the multifunction device 110 is currently in a state of being capable of receiving data. Concretely, the CPU 30 makes a judgment of whether or not the current time has been stored in the receivable period table TB1 for the multifunction device 110. When the multifunction device 110 is not in the state of being capable of receiving data (NO at step S114), the process advances to step S116. At step 116, the CPU 30 changes the job generated by the IPFAX transmission operation this time to a job of time-specified transmission. Concretely, in the job table TB4, information of the multifunction device 110 is stored in the communication-destination information 82. Moreover, as the job executing time 83, any of the time in data receivable period of the multifunction device 110 is stored. Thereafter, the process returns to step S100.

On the other hand, when the CPU 30 makes a judgment that the multifunction device is capable of receiving data (YES at step S114), the process advances to step S120. At step S120, the CPU 30 transmits an INVITE message to the SIP server 220 with the SIPURI acquired in the IPFAX transmission operation as the destination. The SIP server 220 transfers the INVITE message to the multifunction device 110. Here, in FIG. 10, an example of an SDP (Session Description Protocol) of the INVITE message is shown. As the multifunction device 110 receives the INVITE message, the multifunction device 110 transmits 200OK to the SIP server 220. The SIP server 220 transfers 200OK to the multifunction device 10. Here, in FIG. 11, an example of an SDP of 200OK for the INVITE message is shown.

At step S121, the CPU 30, after transmitting the INVITE message, monitors whether or not 200OK has been received from the multifunction device 110 via the SIP server 220. When 200OK has not been received (NO at step S121), the process returns to step S121, and when 200OK has been received (YES at step S121), the process advances to step S122.

At step S122, the CPU 30 transmits an ACK signal to the SIP server 220, with SIPURI acquired by the IPFAX transmission operation as destination. The SIP server 220 transfers the ACK signal to the multifunction device 110. The multifunction device 110 receives the ACK signal. Accordingly, a communication session is established between the multifunction device 10 and the multifunction device 110.

As the communication session is established, at step S124, the CPU 30 transmits a capability notification request message to the multifunction device 110. The capability notification request message is transmitted based on a GET method in an HTTP (Hyper Text Transfer Protocol) communication protocol. Here, an example of the capability notification request message is shown in FIG. 12.

The multifunction device 110 makes a capability response by sending back a capability response message (an example of the second capability information) to the capability notification request message. The capability response message is a response to the GET method. An example of the capability response message is shown in FIG. 13 and FIG. 14. FIG. 13 is an example of message when the multifunction device 110 is not capable of receiving data. Although receivable-period information (deviceAvailableTime) (area A11 in FIG. 13) is included in this message, a recording capability declaration (deviceCapability) is not included in this message. On the other hand, FIG. 14 is an example when the multifunction device 110 is capable of receiving data. In this example, in addition to the receivable-period information (an area A21 in FIG. 14), the recording capability declaration (an area A22 in FIG. 14) is included. At step S126, the CPU 30 makes a judgment of whether or not the capability response message has been received from the multifunction device 110. When the capability response message has not been received (NO at step S126), the process returns to step S126, and when the capability response message has been received (YES at step S126), the process advances to step S128.

At step S128, the CPU 30 makes a judgment of whether or not the receivable-period information has been included in the capability response message. When the receivable-period information has not been included in the capability response message (NO at step S128), the process advances to step S134 (FIG. 3), and when the receivable-period information has been included in the capability response message (YES at step S128), the process advances to step S130. At step S130, when the receivable period table TB1 for the multifunction device 110 has not yet been stored in the memory 32, the CPU 30 creates newly a receivable period table TB1 for the multifunction device 110, and stores in the memory 32. Thereafter, the CPU 30 stores the receivable period in the receivable period table TB1 which has been created newly. Whereas, when the receivable period table TB1 for the multifunction device 110 has already been stored in the memory 32, the CPU 30 updates the receivable period stored in the receivable period table TB1 to receivable period which is acquired this time.

At step S134 (FIG. 3), the CPU 30 makes a judgment of whether or not the multifunction device 110 is in a state of being capable of receiving data. Concretely, as a first condition, the CPU 30 makes a judgment of whether the recording capability declaration has been included in the capability response message which has been received from the multifunction device 110. When the recording capability declaration has been included in the capability response message, a judgment is made that the multifunction device 110 side is not in a state of being busy etc., but is in a state without any error occurred therein. Moreover, as a second condition, the CPU 30 makes a judgment of whether the current time is within data receivable period of the multifunction device 110, by using the table TB1 for the multifunction device 110. Thereafter, when both the first condition and the second condition are satisfied, the CPU 30 makes a judgment that the multifunction device 110 is in the state of being capable of receiving data (YES at step S134), and the process advances to step S150.

At step S150, the CPU 30 generates contents data (an example of the second data) based on the recording capability declaration which has been received at step S134. The contents data is data corresponding to one page of FAX message. At step S152, the CPU 30 transmits the contents data equivalent to one page which has been generated, to the multifunction device 110. The contents data is transmitted based on a POST method in the HTTP communication protocol. Here, in FIG. 16, an example of the contents data is shown.

At step S154, the CPU 30 makes a judgment of whether or not a reception complete response has been received from the multifunction device 110. The reception complete response is a response with respect to the POST method. When the reception complete response has not been received (NO at step S126), the process returns to step S154, and when the reception complete response has been received (YES at step S154), the process advances to step S156.

At step S156, the CPU 30 makes a judgment of whether or not contents data of the subsequent page to be translated exists. When the contents data of the subsequent page does exist (YES at step S156), the process returns to step S152, and the CPU 30 transmits the contents data of the subsequent page by the POST method. Whereas, when the contents data of the subsequent page does not exist (NO at step S156), the process advances to step S160.

At step S160, the CPU 30 makes a judgment of whether or not other FAX data, for which the communication-destination is the multiple function device 110 with the session established currently, has been stored in the data holding area 39. When the other FAX data with the multiple function device 110 as the communication destination has been stored in the data holding area 39 (YES at step S160), the process advances to step S162. At step S162, the CPU 30 generates contents data from the other FAX data, based on the recording capability declaration. Thereafter, the process returns to step S152, and the CPU 30 transmits the contents data which has been generated, to the multifunction device 110 by the POST method.

Whereas, when the other FAX data with the multiple function device 110 as the communication destination has not been stored in the data holding area 39 (NO at step S160), the process advances to step S170. At step S170, the CPU 30 transmits a BYE signal to the SIP server 220. The BYE signal is a command for terminating the communication session which has been established between the multifunction device 10 and the multifunction device 110. The SIP server 220 transmits the BYE signal which has been received, to the multifunction device 110. As the multifunction device 110 receives the BYE signal, the multifunction device 110 transmits 200OK to the SIP server 220. The SIP server 220 transfers 200OK to the multifunction device 10. At step S172, the CPU 30 monitors whether or not 200OK has been received from the SIP server 220. When 200OK has not been received (NO at step S172), the process returns to step S172, and when 200OK has been received (YES at step S172), the communication session between the multifunction device 10 and the multifunction device 110 is terminated. Thereafter, the process returns to step S100.

Moreover, when at step 134, the CPU 30 has made a judgment that the multifunction device 110 is not in a state of being capable of receiving data (NO at step S134), the process advances to step S140. At step S140, the CPU 30 changes the job generated by the IPFAX transmission operation this time, to a job of time-specified transmission. The process of changing to the job of time-specified transmission being similar to the process at step S116, the description thereof will be omitted here. At step S142, the CPU 30 transmits a change complete notification of the transmission time to the multifunction device 110 by the POST method. Here, in FIG. 13, an example of an SDP of change-complete notification of the transmission time is shown.

At step S144, the CPU 30 monitors whether or not 200OK has been received from the multifunction device 110, via the SIP server 220. When 200OK has not been received (NO at step S144), the process returns to step S144, and when 200OK has been received (YES at step S144), the process advances to step S170. An operation from step S170 being as mentioned above, the description in detail thereof will be omitted.

Figure 4:
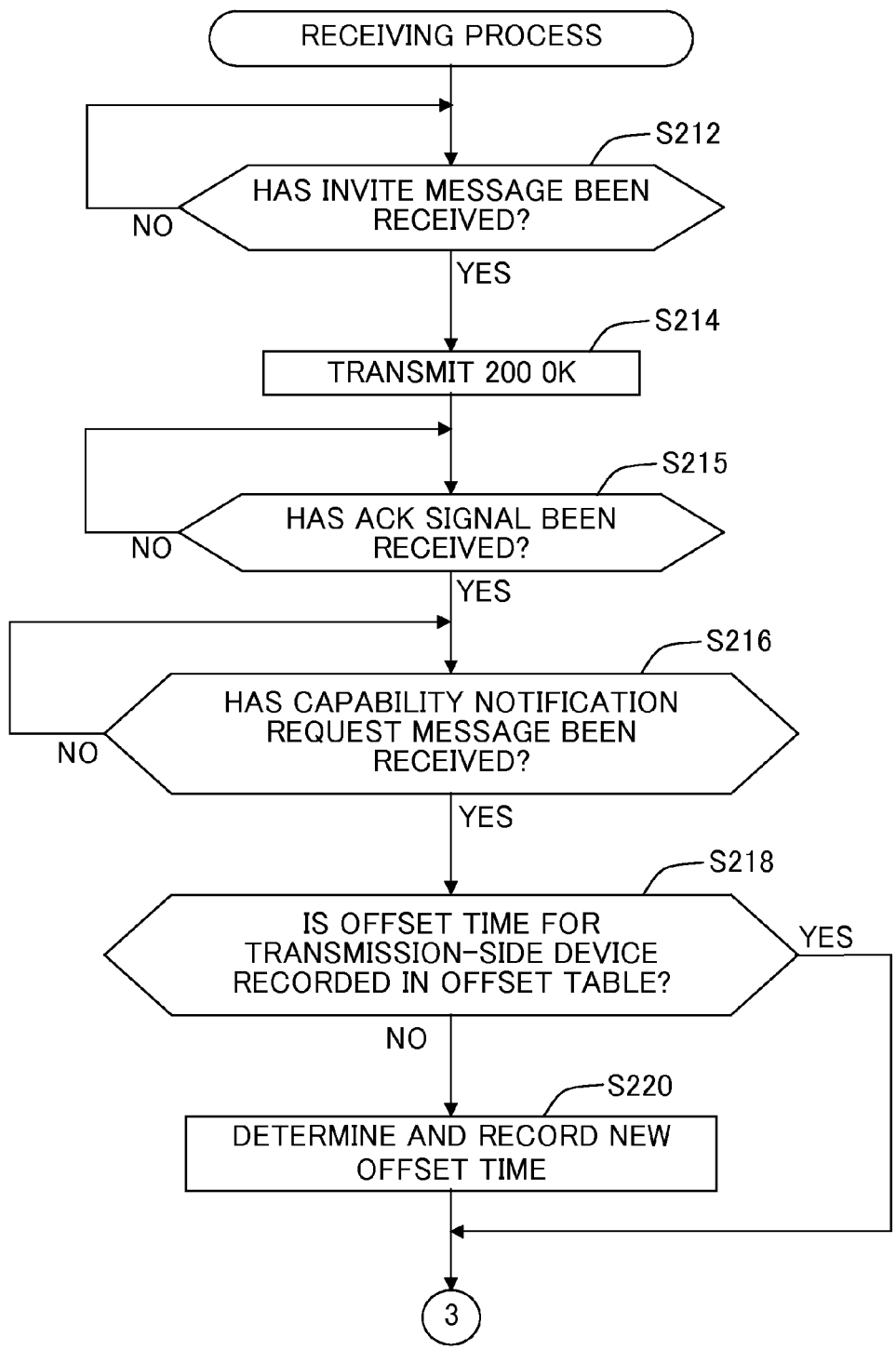
FIG. 4 is a flowchart indicating a process of receiving by a multifunction device on a receiving side.
Figure 5A:
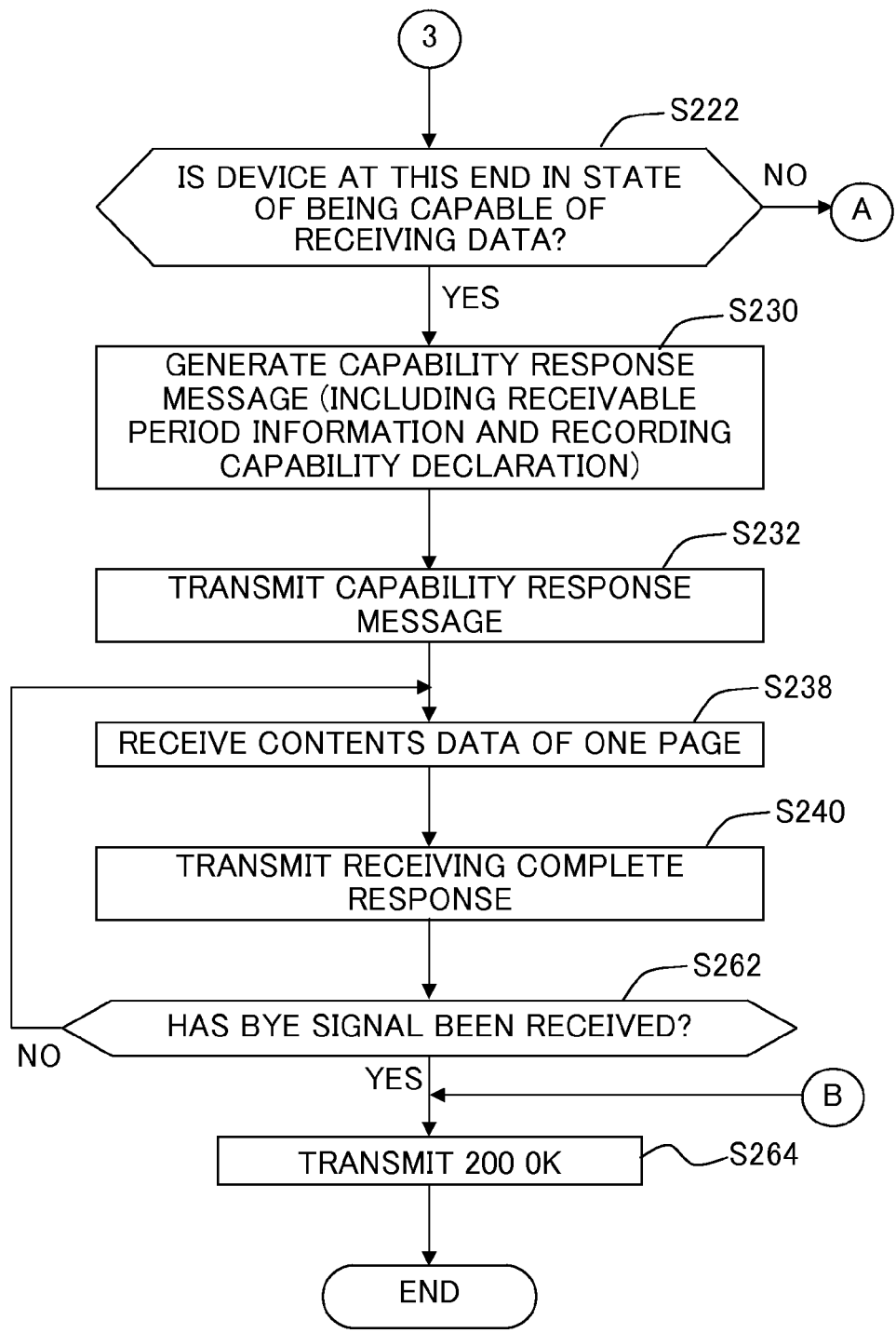
FIGS. 5A and 5B show a flowchart indicating the processing of receiving by the multifunction device on the reception side.
Figure 5B:
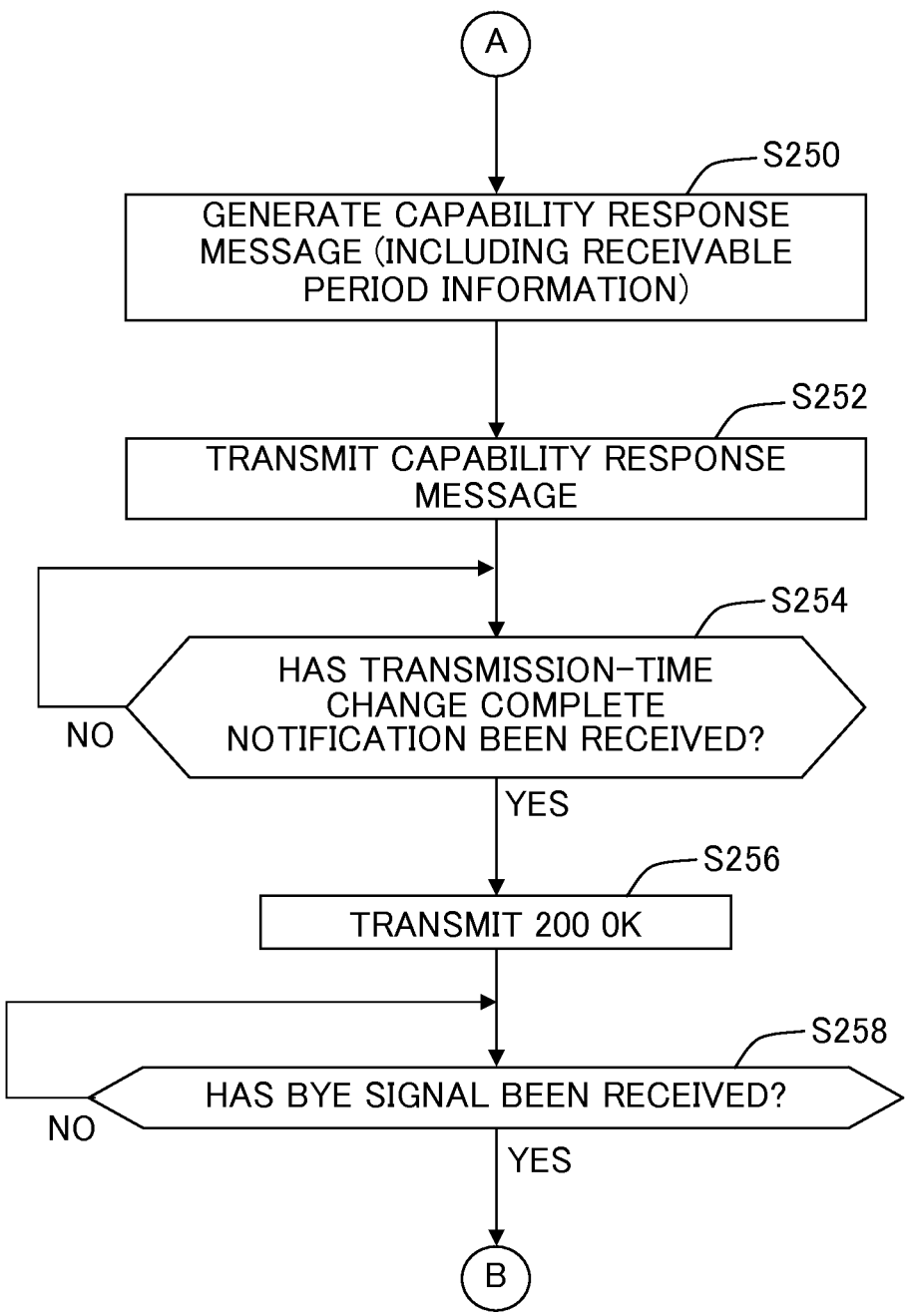

An operation of the multifunction device 110 which is the receiving-side equipment of FAX data will be described below by using FIG. 4 and FIG. 5. A flowchart in FIG. 4 and a flowchart in FIG. 5 are flowcharts of a process being executed while the electric power supply of the multifunction device is ON. At step S212, the CPU 130 makes a judgment of whether or not an INVITE message has been received from the multifunction device 10 which is the transmission-side equipment. When the CPU 130 has made a judgment that the INVITE message has not been received (NO at step S212), the process returns to step S212. When the CPU 130 has made a judgment that the INVITE message has been received (YES at step S212), the process advances to step S214. At step S214, the CPU 130 transmits 200OK to the multifunction device 10 via the SIP server 220. At step S215, the CPU 130 makes a judgment of whether or not an ACK signal has been received from the multifunction device 110. When the ACK signal has not been received (NO at step S215), the process returns to step S215, and when the ACK signal has been received (YES at step S215), the process returns to step S216.

At step S216, the CPU 130 makes a judgment of whether or not a capability notification request message based on the GET method has been received from the multifunction device 10. When the capability notification request message has not been received from the multifunction device 10 (NO at step S216), the process returns to step S216. When the capability notification request message has been received from the multifunction device 10 (YES at step S216), the process advances to step S218.

At step S218, the CPU 130 makes a judgment of whether or not the offset time 73 for the multifunction device 10 which is the transmission-side equipment has been recorded in the offset table TB13. When the offset time 73 has been recorded in the offset table TB13 (YES at step S218), the process advances to step S222 (FIG. 5). When the offset time 73 has not been recorded in the offset table TB13 (NO at step S218), the process advances to step S220. At step S220, the CPU 130 determines a new offset time 73 for the multifunction device 10, and records in the offset table TB13. The new offset time 73 is determined such that each of the plurality of offset times 73 stored in the offset table TB13 has a different value. For instance, the new offset time 73 may be determined by adding a predetermined value to the maximum value of the offset time 73 stored in the offset table TB13.

At step S222 (FIG. 5), the CPU 130 makes a judgment of whether or not the multifunction device 110 is in a state of being capable of receiving data. Concretely, in a case in which the current time is within a period of the receivable period stored in the receivable period table TB11 for the multifunction device 110, and in a case in which there is no error such as a busy state in the multifunction device 110, the multifunction device 110 is judged to have been in the state of being capable of receiving data. When the multifunction device 110 is in the state of being capable of receiving data (YES at step S222), the process advances to step S230. At step S230, the CPU 130 generates a capability response message. The multifunction device 110 being in the state of being capable of receiving data, the CPU 130 generates the capability response message which includes receivable-period information (deviceAvailableTime) and recording capability declaration (deviceCapability) as shown in an example in FIG. 14.

A method for creating the receivable-period information at step S230 will be described below. The CPU 130 creates the receivable-period information by adding the offset time 73 for the multifunction device 10 stored in the offset table TB13 to each starting time of each day of a week of the receivable period which has been stored in the receivable period table TB11. For instance, a case, in which each of the contents stored in the receivable period table TB11 and the offset table TB13 which have been stored in the multifunction device 10 is a content shown in FIG. 6 and FIG. 8, will be described below. In this case, the offset time 73 (10 minutes) for the multifunction device 10 (FIG. 8, the communication-destination information 72=052-333-4567) is added to the starting time (10:00) of the receivable period (FIG. 6, 10:00-18:00) on Monday. Therefore, the receivable-period information of Monday which is to be transmitted to the multifunction device 10 becomes "10:10-18:00". Similarly, the receivable-period information of Monday which is to be transmitted to the multifunction device 110a becomes "10:05-18:00". Moreover, the receivable-period information of Monday which is to be transmitted to the multifunction device 110b becomes "10:00-18:00". The method of generating the receivable-period information for days of a week from Tuesday to Saturday being similar to the method of generating the receivable-period information of Monday, the description thereof will be omitted here.

As it has been described above, the multifunction device 110 on the data-receiving side is capable of setting the receivable-period information for each of the multifunction devices 10, 110a, and 110b of a plurality of different data-transmitting sides such that the starting time differs mutually. Accordingly, it is possible to let the transmission-start time at the time of transmitting data to the multifunction device 110 on the data-receiving side 1 from the communication apparatuses (multifunction devices 10, 110a, and 110b) on the plurality of data-transmitting sides. Therefore, it is possible to prevent a situation, in which data which is transmitted is converged at a certain specific time (such as 10:00 on Monday), and the multifunction device 110 on the data-receiving side is in busy state.

At step S232, the CPU 130 transmits the capability response message which has been generated, to the multifunction device 110. The capability response message is a response with respect to the GET method. At step S238, the CPU 130 receives contents data equivalent to one page from the multifunction device 10. At step S240, the CPU 130 transmits a reception complete response to the multifunction device 10. The reception complete response is a response with respect to the POST method.

At step S262, the CPU 130 makes a judgment of whether or not the BYE signal has been received from the multifunction device 10 via the SIP server 220. When the BYE signal has not been received (NO at step S262), the process returns to step S238, and contents data of the subsequent page is received. Whereas, when the BYE signal has been received (YES at step S262), the process advances to step S264. At step S264, the CPU 130 transmits 2000K to the multifunction device 10. Thereafter the flow is terminated.

On the other hand, at step S222, in a case in which, the multifunction device 110 is not in a state of being capable of receiving data (NO at step S222), the process advances to step S250. At step S250, the CPU 130 generates the capability response message. The multifunction device not being in the state of capable of receiving data, (the CPU 130) generates the capability response message, in which the receivable-period information (deviceAvailableTime) is included but the recording capability declaration (deviceCapability) is not included.

At step S252, the CPU 130 transmits the capability response message which has been created, to the multifunction device 10. At step S254, the CPU 130 makes a judgment of whether or not a transmission-time change complete notification has been received from the multifunction device 10. When the transmission-time change complete notification has not been received from the multifunction device 10 (NO at step S254), the process returns to step S254, and when the transmission-time change complete notification has been received from the multifunction device 10 (YES at step S254), the process advances to step S256. At step S256, the CPU 130 transmits 2000K to the multifunction device 10 via the SIP server 220. At step S258, the CPU 130 makes a judgment of whether or not the BYE signal has been received from the multifunction device 10 via the SIP server 220. When the BYE signal has not been received (NO at step S258), the process returns to step S258, and when the BYE signal has been received (YES at step S258), the process advances to step S264. At step S264, the CPU 130 transmits 2000K to the multifunction device 10. Thereafter, the flow is terminated.

<Concrete Example of Operation>

Figure 17A:
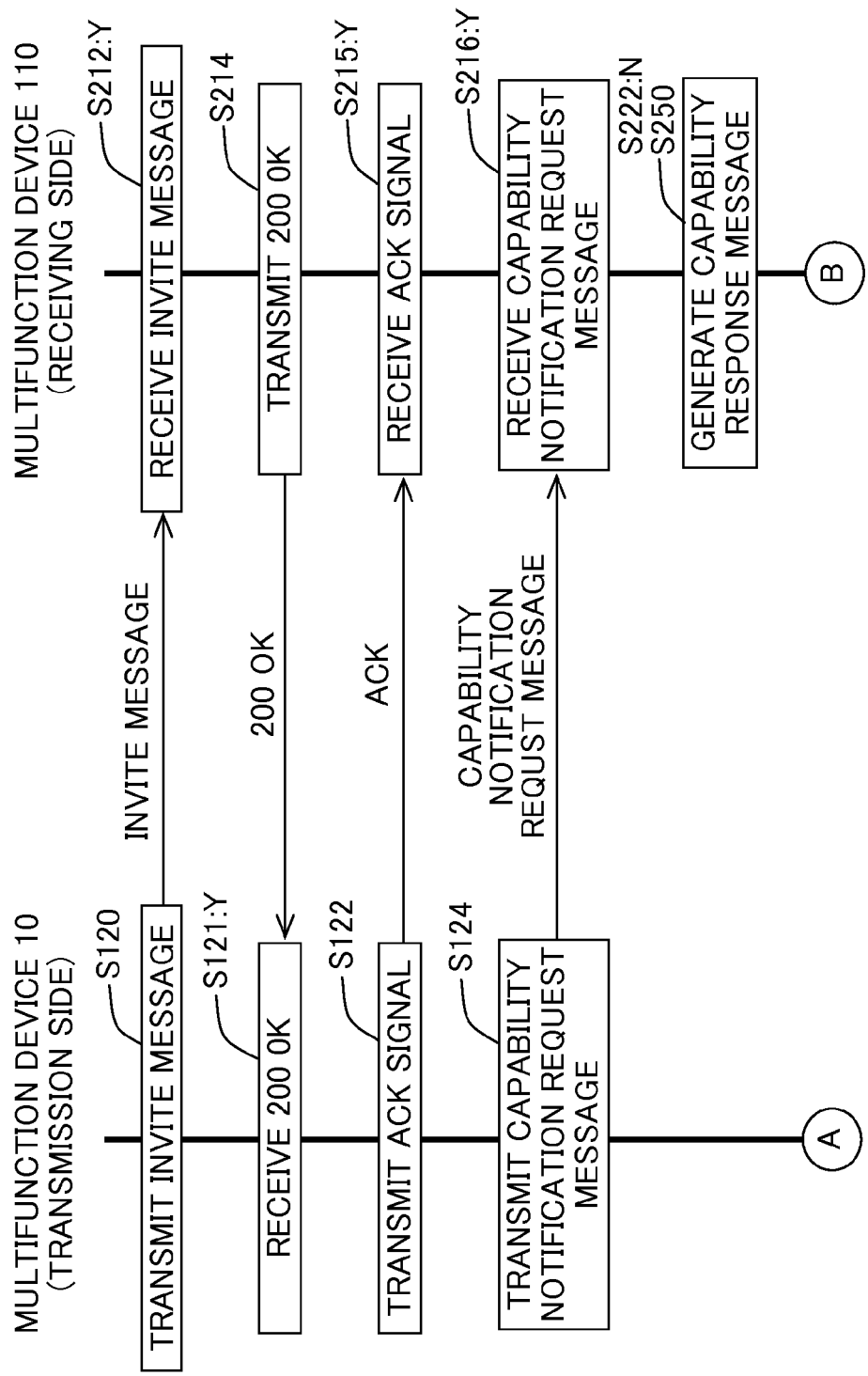
FIGS. 17A and 17B are diagrams showing a concrete example of an operation of the communication system.
Figure 17B:
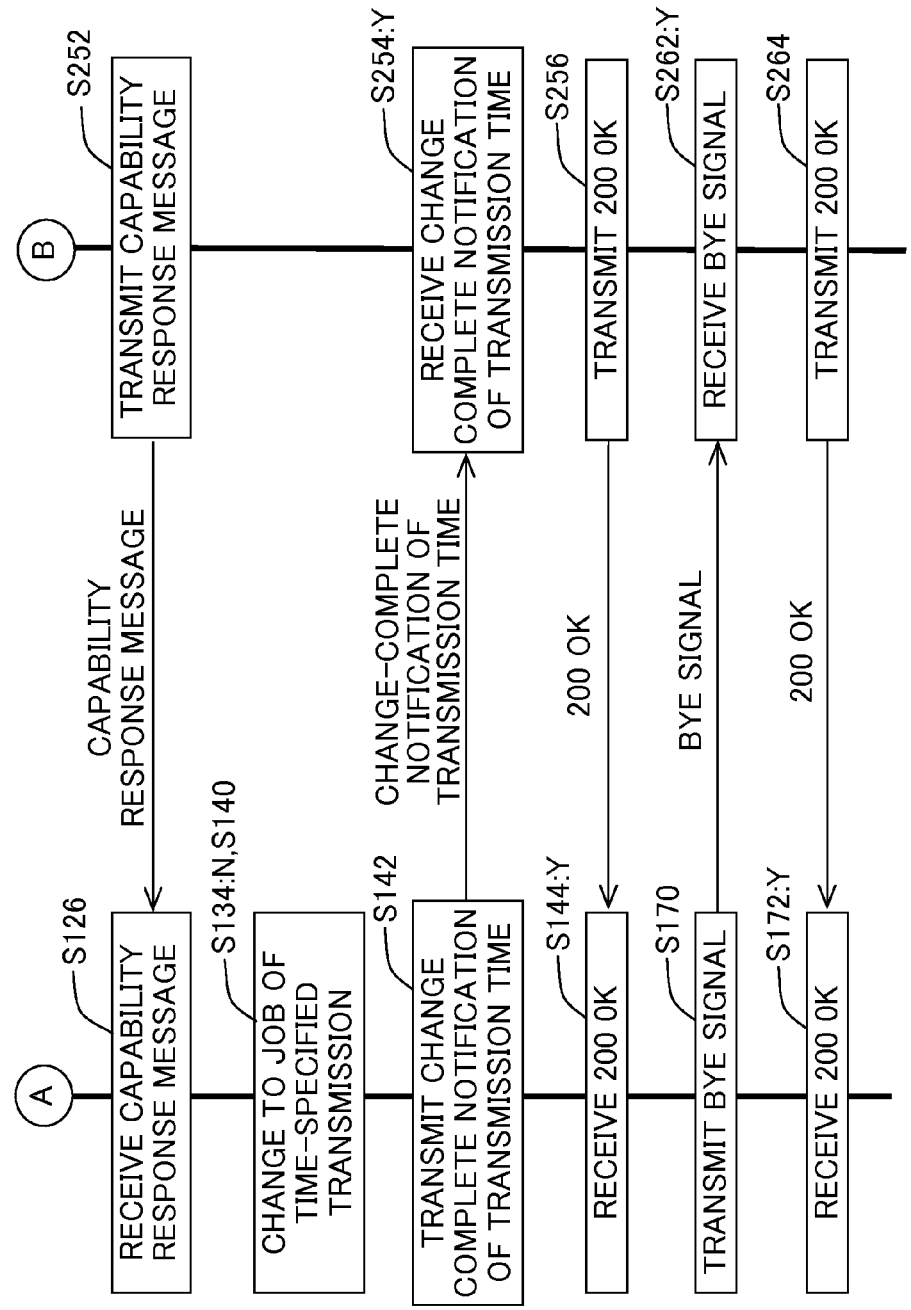
Figure 18B:
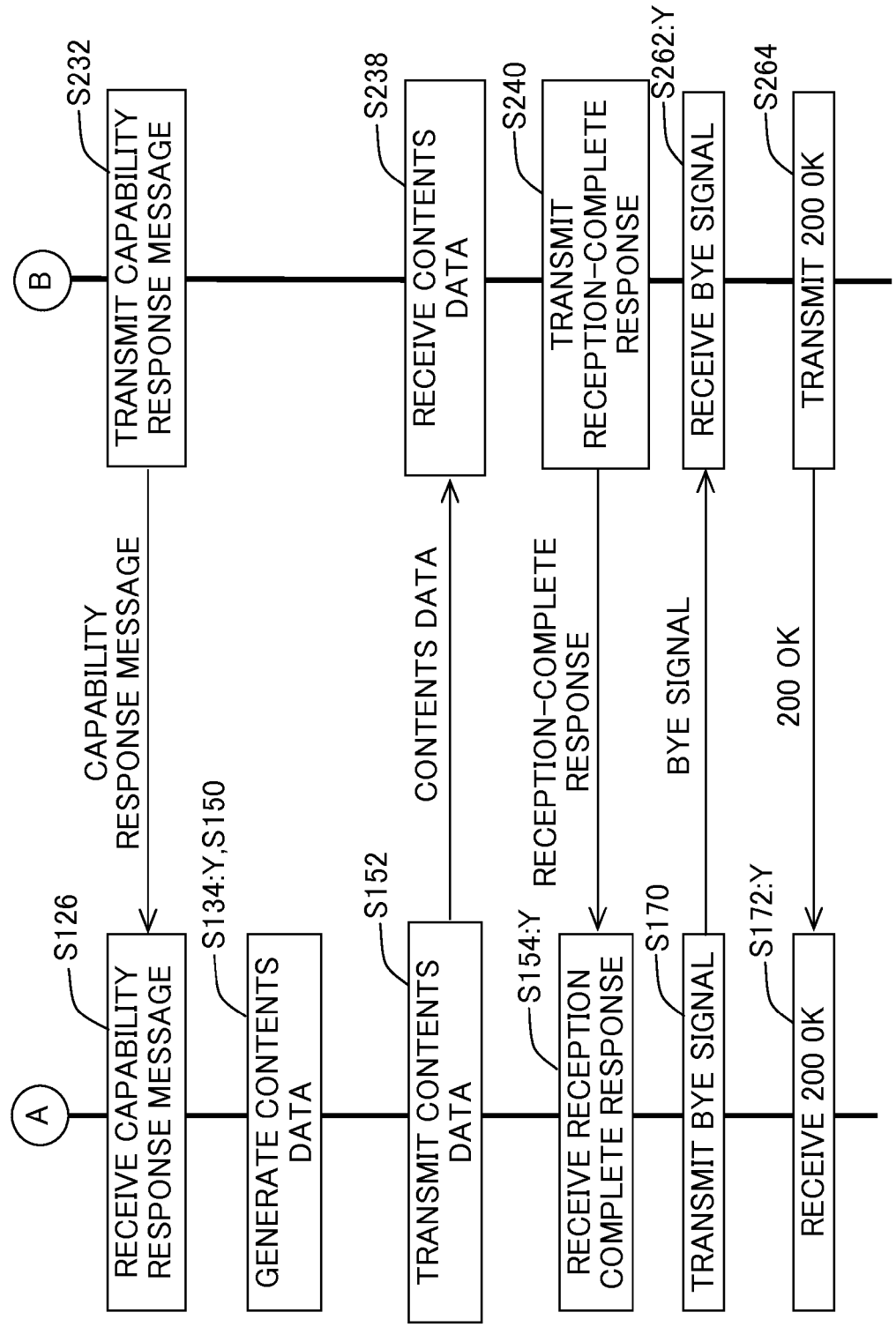
Figure 19B:
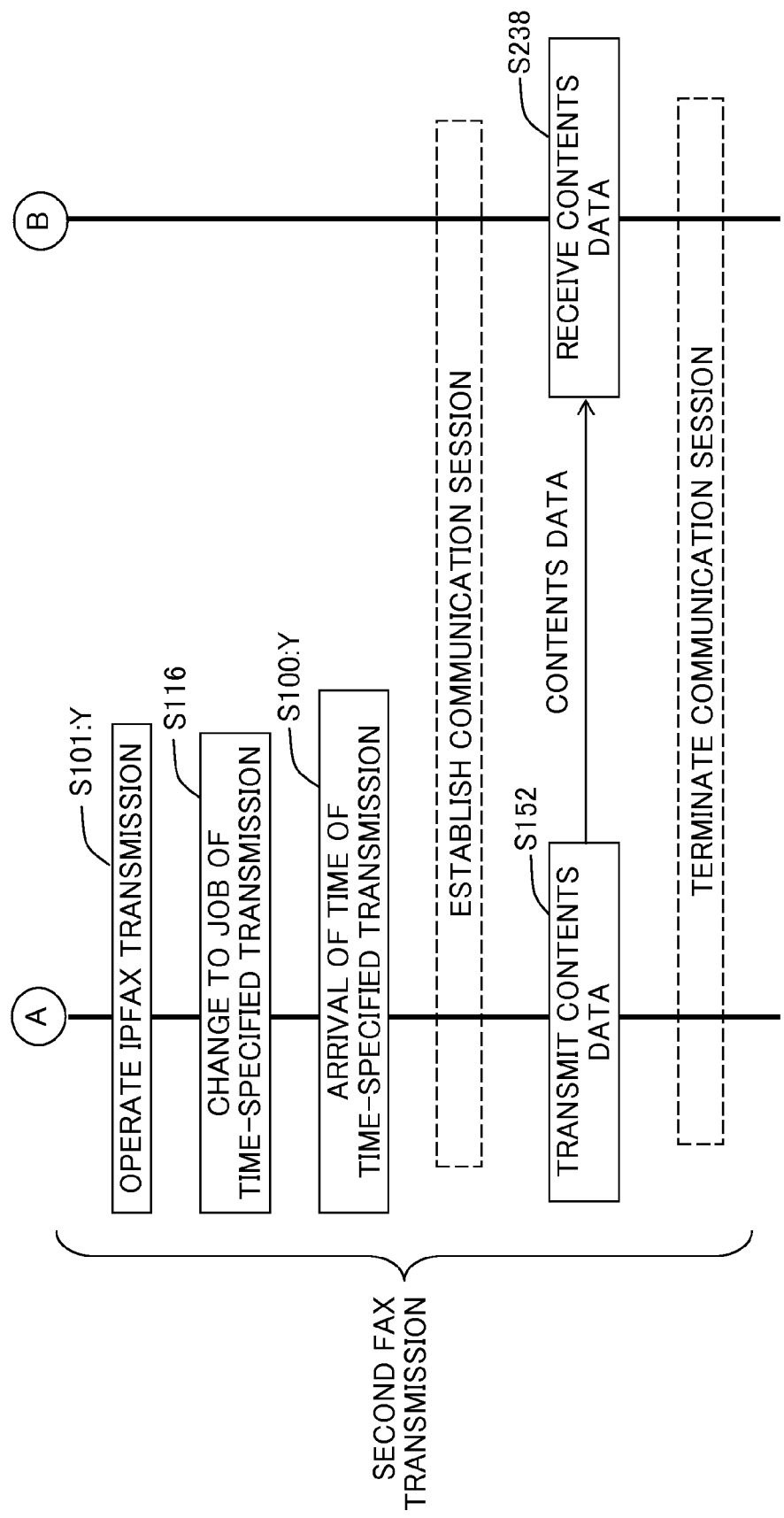

A concrete example of an operation of the communication system 2 according to the embodiment will be described below by using a sequence in diagrams from FIG. 17 to FIG. 19. In the diagrams from FIG. 17 to FIG. 19, an operation when a FAX is transmitted from the multifunction device 10 to the multifunction device 110 is described as an example. Moreover, a case, in which a storage content of the receivable period table TB11 stored in the multifunction device 110 is content shown in FIG. 6, will be described below.

An operation in FIG. 17 will be described below. The operation in FIG. 17 is an operation when an IPFAX transmission operation is carried out by the multifunction device 10. As an example, a case, in which the IPFAX transmission operation is carried out by the multifunction device 10 at 10:00 on Sunday, will be described below. Moreover, an operation from a point of time, at which the IPFAX transmission operation is carried out (YES at step S101), and generating and storing of FAX data (step S102 and step S104) are finished, will be described below. As the multifunction device 10 transmits the INVITE message (step S120), the multifunction device 110 receives the INVITE message (YES at step S212). As the multifunction device 110 transmits 2000K (step S214), the multifunction device 10 receives 2000K (YES at step S121). As the multifunction device 10 transmits the ACK signal (step S122), the multifunction device 110 receives the ACK signal (YES at step S215). Accordingly, a communication session is established between the multifunction device 10 and the multifunction device 110.

The multifunction device 10, based on the GET method, transmits the capability notification request message to the multifunction device 110 (step S124). As the multifunction device 110 receives the capability notification request message (YES at step S216), since the current time (10:00 on Sunday) is not within the period of the receivable period which has been recorded in the receivable period table TB11

(FIG. 6), the CPU 130 makes a judgment that the multifunction device 110 is not in the state of being capable of receiving data (NO at step S222). Therefore, the CPU 130 creates a capability response message in which, the receivable-period information is included but the recording capability declaration is not included (step S250). Moreover, the multifunction device 110 transmits the capability response message which has been created, to the multifunction device 10 (step S252).

As the multifunction device 10 receives the capability response message from the multifunction device 110 (YES at step S126), since the recording capability declaration is not included in the capability response message, the CPU 130 makes a judgment that the multifunction device 110 is not in the state of being capable of receiving data (NO at step S134). Therefore, the CPU 130 changes a job generated by the IPFAX transmission operation this time to a job of time-specified transmission at 10:00 on Monday (step S140), and transmits the change complete notification of the transmission time to the multifunction device 110 (step S142). As the multifunction device 110 receives the transmission-time change complete notification from the multifunction device 10 (YES at step S254), the multifunction device 110 transmits 2000K to the multifunction device 10 (step S256). The multifunction device 10 receives 2000K (YES at step S144).

As the multifunction device 10 transmits the BYE signal (step S170), the multifunction device 110 receives the BYE signal (YES at step S262). As the multifunction device 110 transmits 2000K (step S264), the multifunction device 10 receives 2000K (step S172). Accordingly, the communication session between the multifunction device 10 and the multifunction device 110 is terminated.

An operation in FIG. 18 will be described below. The operation in FIG. 18 is an operation when the IPFAX transmission operation has been carried out during a period of the receivable period of the multifunction device 110. As an example, a case, in which the IPFAX transmission operation is carried out at 13:00 on Tuesday, will be described below. An operation till the communication session is established between the multifunction device 10 and the multifunction device 110 being similar to the operation in FIG. 17, the description thereof will be omitted here.

The multifunction device 10, based on the GET method, transmits the capability notification request message to the multifunction device 110 (step S124). As the multifunction device 110 receives the capability notification request message (YES at step S216), since the current time (13:00 on Tuesday) is in a period in the receivable period which has been stored in the receivable period table TB11 (FIG. 6), the CPU 130 makes a judgment that the multifunction device 110 is in the state of being capable of receiving data (YES at step S222). Accordingly, the CPU 130 creates a capability response message in which the receivable-period information and the recording capability declaration are included (step S230). Moreover, the multifunction device 110 transmits the capability response message which has been created, to the multifunction device 10 (step S232).

As the multifunction device 10 receives the capability response message from the multifunction device 110 (YES at step S126), since the recording capability declaration is included in the capability response message, the CPU 130 makes a judgment that the multifunction device 110 is in the state of being capable of receiving data (YES at step S134). Therefore, the multifunction device 10 generates contents data based on the recording capability declaration (step S150), and transmits the contents data to the multifunction device 110 (step S152). As the multifunction device 110 receives the contents data from the multifunction device 10 (step S238), the multifunction device 110 transmits the reception complete response to the multifunction device 10 (step S240). An operation here onward till the termination of the communication session between the multifunction device 10 and the multifunction device 110 being similar to the operation in FIG. 17, the description thereof will be omitted here.

An operation in FIG. 19 will be described below. The operation in FIG. 19 is an operation when the FAX transmission is carried out for the first time from the multifunction device 10 to the multifunction device 110, and when the second FAX transmission thereafter is carried out from the multifunction device 10 to the multifunction device 110. As an example, a case in which, the first IPFAX transmission operation is carried out during a period (13:00 on Tuesday for example) of the receivable period of the multifunction device 110, and the second IPFAX transmission operation is carried out during a period (10:00 on Sunday for example) other than the receivable period will be described below.

As the IPFAX transmission operation is carried out (YES at step S101), a judgment of whether or not the receivable period is stored in the receivable period table TB1 for the multifunction device 110 is made (step S112). Since there has been no communication with the multifunction device 10 so far, and no receivable period of the multifunction device 110 has been received from the multifunction device 110, the receivable period has not been stored in the receivable period table TB1 for the multifunction device 110 (NO at step S112). Therefore, an operation which establishes the communication session is carried out. An operation till the communication session is established being similar to the operation in FIG. 17, the description thereof will be omitted here.

The multifunction device 110 transmits the capability response message which has been created, to the multifunction device 10 (step S232). As the multifunction device 10 receives the capability response message from the multifunction device 110 (YES at step S126), since the receivable-period information is included in the capability response message (YES at step S128), the CPU 130 generates newly the receivable period table TB1 for the multifunction device 110, and stores in the memory 32 (step S130). The multifunction device 10 transmits contents data to the multifunction device 110 (step S152). The multifunction device 110 receives the contents data from the multifunction device 10 (step S238). From here onward, an operation till terminating the communication session between the multifunction device 10 and the multifunction device 110 being similar to the operation in FIG. 17, the description thereof will be omitted here. As it has been described above, the first IPFAX transmission operation ends.

As the second IPFAX transmission operation is carried out (YES at step S101), a judgment is made that the receivable period has been stored in the receivable period table TB1 for the multifunction device 110 (YES at step S112), and that the multifunction device 110 is not in the state of being capable of receiving data based on the receivable period (NO at step S114). Therefore, the job which has been generated by the IPFAX transmission operation this time is changed to the job of time-specified transmission (10:00 on Monday) (step S116).

As the time of the time-specified transmission of FAX data arrives (YES at step S100), an operation to establish a communication session is carried out, and the multifunction device 10 transmits contents data to the multifunction device 110 (step S152). The multifunction device 110 receives the contents data from the multifunction device 10 (step S238).

Thereafter, the CPU 130 terminates the communication session between the multifunction device 10 and the multifunction device 110.

In the embodiment as described above, the example of the case, in which the multifunction device 10 carries out the FAX-transmission process with respect to the multifunction device 110, has been explained. On the other hand, in a case that the multifunction device 110 carries out the FAX-transmission process with respect to the multifunction device 10, the multifunction device 110 performs transmission processes which are similar to the transmission processes of the multifunction device 10 as described above, and the multifunction device 10 performs receiving processes which are similar to the receiving processes of the multifunction device 110 as described above. In this case, the multifunction device 10 sends a capability response message (an example of the first capability information) to the multifunction device 110, and the multifunction device 110 sends contents data (an example of the first data) to the multifunction device 10.

An effect of the communication system according to the example of the embodiment described above will be described below. The multifunction device 110 on the data-receiving side is capable of transmitting to the multifunction device 10 on the data-transmission side, the capability response message which includes the receivable-period information related to the period during which the multifunction device 110 is capable of receiving data, by using the GET method (step S232 and step S252). Moreover, the multifunction device 10 on the data-transmission side is capable of identifying the period during which the multifunction device 110 is capable of receiving data, by receiving the capability response message by the GET method (step S134). The multifunction device 10 on the data-transmission side is capable of waiting for transmission by holding the FAX data in the data holding area 39 till the period during which the multifunction device 110 on the data-receiving side is capable of receiving data, arrives (step S140). As the multifunction device 10 transmits the contents data by using the POST method during the period during which the multifunction device 110 is capable of receiving data (step S152), the multifunction device 110 is capable of receiving the contents data (step S238).

Accordingly, it is possible to prevent a situation in which, the FAX data is transmitted from the multifunction device 10 on the data-transmission side, during the period during which the multifunction device 110 on the data-receiving side is not capable of receiving data (the period during which the power supply of the multifunction device 110 is in OFF mode, other than the period in the receivable period of the multifunction device 110). Therefore, it is possible to eliminate a need for carrying out dialing by the multifunction device 10. Moreover, it is possible to eliminate a need for carrying out once again a procedure for FAX transmission by the user, which may arise due to communication error. Accordingly, it is possible to improve convenience of the user.

Moreover, the communication system 2 according to the embodiment is useful in a case such as the following case. For confidentiality reasons of data, there is a case in which receiving and printing of FAX data is intended to be carried out by the multifunction device 10, only during business hours of an office. In such case, it is preferable to set in advance the receivable time (business hours) in the receivable period table TB1. For instance, in a case in which, the receivable time is set as in the receivable period table TB1 shown in FIG. 6, when a FAX-transmission operation which the multifunction device 10 as destination is carried out during time other than business hours (10:00 on Sunday for example) by the external multifunction device 110, the FAX transmission from the multifunction device 110 to the multifunction device 10 is on standby till the business hours (10:00 on Monday) arrive. Accordingly, it is possible to carry out receiving and printing of FAX data by the multifunction device 10 only during the working hours.

Moreover, in the communication system 2, the communication of the capability response message is carried out based on the GET method which is an HTTP communication protocol. Accordingly, it is possible to carry out freely the communication of the capability response message between the multifunction device 10 on the data-transmission side and the multifunction device 110 on the data-receiving side.

Moreover, the multifunction device 10 on the data-communication side is capable of storing a plurality of receivable period tables TB1 for the multifunction device 110, 110a, and 110b respectively, on the data-receiving side. Accordingly, even in a case in which, there exists a plurality of multifunction devices on the data-receiving side, it is possible to transmit FAX data during a period in which, each multifunction device is capable of receiving data.

In the communication via the IP network 4, it is necessary to carry out a line connection process (transceiving of INVITE message and 2000K) for establishing a communication session. In the communication system 2 according to the embodiment, in a case in which, FAX data of 1 is transmitted to a multifunction device with which the communication session has been established, when there exists other FAX data with the same multifunction device as destination (YES at step S160), it is possible to transmit the other data by using a session which has already been established (step S152). Therefore, since it is possible to reduce a frequency of carrying out line connection process, it is possible to reduce a loss of transmission time.

The concrete example of the present invention has been described above in detail. However, this is just an exemplification, and does not restrict the scope of patent claims. The technology described within the scope of the patent claims includes various transformations and modifications made in the concrete example which has been described above.

Modified Embodiments

The protocol to be used for the transmission of contents data (step S152) or the transmission of reception complete response (step S240) is not restricted to the POST method. It is possible to use various protocols (such as T.38 type format or deemed voice-transmission system) for transmitting FAX data. Accordingly, it is possible to carry out the communication of FAX data by using a normal protocol which has hitherto been used.

In the embodiment, the example of the case, in which the multifunction device 10 carries out the FAX-transmission process with respect to the multifunction device 110, has been explained. However, the technology is also applicable to various data-transmission processes (such as electronic-mail transmission process).

The storage contents of the receivable period table TB1 (FIG. 6), the transmission-side control table TB2 (FIG. 7), the offset table TB3 (FIG. 8), and the job table TB4 (FIG. 9) described in the embodiment are mere examples. Therefore, the number of communication-destination information, the receivable period, and the offset time 73 are not restricted to those in the description above. Moreover, in the SDP of the change complete notification of the transmission time in FIG. 1, the transmission time (10:10) and the transmission day (Mon) have been mentioned in an area A31. However, the transmission time and the transmission day are not restricted to the abovementioned transmission time and transmission day. In a case in which, it is preferable to notify only transmission time, only the transmission time may be mentioned in the area A31.

Multifunction devices to be connected to the IP network 4 are not restricted to the four multifunction devices namely the multifunction device 10, the multifunction device 110, the multifunction device 110*a*, and the multifunction device 110*b*, and the technology of the present patent application is also applicable to a case in which, more than four multifunction devices are to be connected to the IP network 4.

Moreover, the technology components which have been described in the present patent specification or drawings exert technological usability independently or by various combinations, and are not restricted to the combinations which are described in the claims at the time of application. Moreover, the technology exemplified in the present patent specification and drawings achieve a plurality of objects simultaneously, and have technological usability by achieving even one of the plurality of objects.

What is claimed is:

1. A communication apparatus which is configured to communicate with a communication-destination device via an IP network, the communication apparatus comprising:
  a processor; and
  a memory storing computer readable instructions, when executed by the processor, causing the communication apparatus to execute:
  generating a first capability information including a first receivable-period information and a recording capability declaration in relation to a first receivable period, during which a first contents data which is transmitted from the communication-destination device via the IP network is acceptable by the apparatus, wherein the communication-destination device includes a plurality of communication-destination devices;
  transmitting the first capability information to the communication-destination device via the IP network;
  receiving the first contents data transmitted from the communication-destination device via the IP network during the first receivable period;
  storing a second contents data in the memory which is to be transmitted to the communication-destination device;
  receiving a second capability information for each of the plurality of communication-destination devices including a second receivable-period information in relation to the second receivable period, during which the second contents data which is transmitted from the apparatus via the IP network is acceptable by the communication-destination device, wherein the second capability information is stored in the memory; and
  transmitting the second contents data which has been stored in the memory to the communication-destination device during the second receivable period based on the second capability information, in a case where the second capability information is received from the communication-destination device,
  wherein in a case where the second contents data is transmitted to at least one communication-destination device among the plurality of communication-destination devices, the second contents data is transmitted based on the second capability information of the at least one communication-destination device,
  wherein in a case that the second contents data stored in the memory includes a plurality of second contents data which are to be transmitted to the at least one communication-destination device among the plurality of communication-destination devices, the plurality of second contents data is transmitted to the at least one communication-destination device by using a communication line which has been established by one line connection process.

2. The communication apparatus according to claim 1, wherein the first capability information is transmitted based on a communication protocol of Hyper Text Transfer Protocol (HTTP) type, and
  the second capability information is received based on the communication protocol of HTTP type.

3. The communication apparatus according to claim 2, wherein the second contents data is transmitted based on a transmission control protocol of deemed voice-transmission system or T.38 type, and
  the first contents data is received based on the communication control protocol of deemed voice-transmission system or T.38 type.

4. The communication apparatus according to claim 1, wherein a plurality of first capability information is generated corresponding to the plurality of communication-destination devices respectively,
  the plurality of first capability information include a plurality of first receivable-period information in relation to a plurality of first receivable periods respectively, and
  the plurality of first receivable periods have starting times, which are different from each other, respectively.

5. A communication system which is configured to transmit a contents data from a transmission-side communication apparatus to a receiving-side communication apparatus via an IP network, wherein the receiving-side communication apparatus includes:
  a first processor; and
  a first memory storing computer readable instructions, when executed by the first processor, causing the receiving-side communication apparatus to execute:
  generating a capability information including a receivable-period information and a recording capability declaration in relation to a receivable period during which the contents data which is transmitted from the transmission-side apparatus via the IP network is acceptable by the receiving-side communication apparatus, wherein the communication-destination device includes a plurality of communication-destination devices;
  transmitting the capability information to the transmission-side communication apparatus via the IP network; and
  receiving the contents data which has been transmitted from the transmission-side communication apparatus via the IP network during the receivable period, and the transmission-side communication apparatus includes:
  a second processor; and
  a second memory storing computer readable instructions, when executed by the second processor, causing the transmission-side communication apparatus to execute:
  storing the contents data which is to be transmitted to the receiving-side communication apparatus in the second memory;
  receiving the capability-information for each of the plurality of communication-destination devices from the receiving-side communication apparatus via the IP network, wherein the capability information is stored in the memory; and
  transmitting to the receiving-side communication apparatus, the contents data which has been stored in the second memory, during the receivable period based on the capability information, in a case where the capability information and a recording capability declaration is received from the receiving-side communication apparatus, wherein in a case where the contents data is transmitted to at least one communication-destination device among the plurality of communication-destination devices, the contents data is transmitted based on the capability information of the at least one communication-destination device, wherein in a case that the contents data stored in the second memory includes a plurality of contents data which are to be transmitted to the at least one communication-destination device among the plurality of communication-destination devices, the plurality of contents data is transmitted to the at least one communication-destination device by using a communication line which has been established by one line connection process.

* * * * *